US012124471B2

(12) United States Patent
Shah et al.

(10) Patent No.: US 12,124,471 B2
(45) Date of Patent: Oct. 22, 2024

(54) METHODS OF ORCHESTRATED DATA SHARING ACROSS CLOUD REGIONS AND CLOUD PLATFORMS OF CLOUD-BASED DATA WAREHOUSING SYSTEMS

(71) Applicant: Capital One Services, LLC, McLean, VA (US)

(72) Inventors: Hiren Shah, Stafford, VA (US); Ganesh Bharathan, Henrico, VA (US); Sridhar Maramreddy, Glen Allen, VA (US); Naga Venkata Sriram Vadakattu, Frisco, TX (US); Naveen Kumar Kilaru, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 190 days.

(21) Appl. No.: 17/838,133

(22) Filed: Jun. 10, 2022

(65) Prior Publication Data
US 2023/0401224 A1      Dec. 14, 2023

(51) Int. Cl.
G06F 16/25       (2019.01)
G06F 16/27       (2019.01)

(52) U.S. Cl.
CPC ............ *G06F 16/254* (2019.01); *G06F 16/27* (2019.01)

(58) Field of Classification Search
CPC ............................. G06F 16/27; G06F 16/254
USPC ........................................................ 707/602
See application file for complete search history.

(56) References Cited

U.S. PATENT DOCUMENTS

| 11,436,145 | B1 | 9/2022 | Narigapalli et al. |
| 2012/0054331 | A1 | 3/2012 | Dagan |
| 2013/0311430 | A1 | 11/2013 | Iizawa et al. |
| 2016/0283304 | A1 | 9/2016 | Horikawa et al. |
| 2017/0251013 | A1 | 8/2017 | Kirti et al. |
| 2020/0301938 | A1 | 9/2020 | Gale et al. |
| 2020/0349156 | A1 | 11/2020 | Frantz et al. |
| 2021/0004382 | A1 | 1/2021 | Nautiyal |
| 2021/0320968 | A1* | 10/2021 | Chu ..................... H04L 67/1097 |
| 2022/0014421 | A1* | 1/2022 | Medam ................. H04L 63/08 |
| 2022/0021652 | A1* | 1/2022 | Moghe ............... H04L 63/0236 |
| 2022/0050855 | A1* | 2/2022 | Chu ................... G06Q 30/0617 |
| 2022/0342933 | A1* | 10/2022 | Lydick ................ G06F 16/2433 |
| 2022/0350922 | A1 | 11/2022 | Blum et al. |

FOREIGN PATENT DOCUMENTS

CN            110262945 A        9/2019

OTHER PUBLICATIONS

Sep. 29, 2023—(WO) Partial Search Result and Provisional Opinion—App No. PCT/US2023/024812.
Nataliya Boyko et al., "Prospects for Using Cloud Data Warehouses in Information Systems" IEEE Xplore, 2018, pp. 136-139.

* cited by examiner

*Primary Examiner* — Robert W Beausoliel, Jr.
*Assistant Examiner* — Lauren Zannah Ganger
(74) *Attorney, Agent, or Firm* — Banner & Witcoff, Ltd.

(57) ABSTRACT

Methods, systems, devices, and computer-readable media for orchestrating the sharing of data between accounts that are hosted by a cloud-based data warehousing system on different cloud platforms or in different cloud regions of a cloud platform, and where such accounts may be associated with different organizations. Sharing of data in the multi-cloud platform and/or multi-cloud region environments may be facilitated by the on-demand creation of one or more data collection accounts.

21 Claims, 17 Drawing Sheets

METHODS OF ORCHESTRATED DATA SHARING ACROSS CLOUD REGIONS AND CLOUD PLATFORMS OF CLOUD-BASED DATA WAREHOUSING SYSTEMS

CROSS-REFERENCE TO RELATED APPLICATIONS

This application is related to co-pending applications U.S. patent application Ser. No. 17/838,117, filed Jun. 10, 2022, and entitled "Methods of Orchestrated Data Sharing Across Cloud Regions and Platforms of Cloud-Based Data Warehousing Systems," U.S. patent application Ser. No. 17/964,215, filed Oct. 12, 2022, and entitled "Methods and System for Generating Recommendations in Cloud-Based Data Warehousing System," and U.S. patent application Ser. No. 17/964,259, filed Oct. 12, 2022, and entitled "Methods and System for Detecting Unmanaged Resources in Cloud-Based Data Warehousing System."

FIELD OF USE

Aspects of the disclosure relate generally to data sharing methods in cloud-based data warehousing systems. More specifically, aspects of the disclosure relate to sharing data across accounts of a cloud-based data warehousing system that are hosted on different cloud platforms or different cloud regions of the cloud-based data warehousing system.

BACKGROUND

Many organizations rely on data warehousing systems to serve as a central repository for integrating and managing data collected from disparate systems or sources internal or external to their organizations. Such data warehousing systems are often used to support reporting, data analysis, and other business intelligence functions and, thus, are generally optimized for such purposes. With the ever-increasing amounts of data and the complexity involved in managing and securing such data, organizations are relying on data warehouse systems provided as a managed service on a public cloud platform (e.g., AMAZON WEB SERVICES cloud platform by Amazon Web Services, Inc. of Seattle, Washington, MICROSOFT AZURE cloud platform by Microsoft, Corporation of Redmond, Washington, GOOGLE CLOUD PLATFORM provided by Google LLC of Menlo Park, California, and/or similar public cloud platforms) to meet their business and data needs. These cloud-based data warehousing systems, sometimes referred to as "data warehouse-as-a-service" systems, may provide several benefits to organizations over on-premises data warehousing systems due to the ease and speed in which such systems may be stood up by the organization, the systems' ability to be integrated with other business systems of the organization, the limited degree of maintenance required by the organization, the ability to readily scale resources provided by the systems to support the organization's current business and data needs, and the various additional services provided by such systems, to name a few.

Further, the use of such data warehouse-as-a-service systems may allow organizations to offload, to the data warehouse-as-a-service provider, complex and expensive data warehousing and query operations, which may otherwise cause computing resource challenges for the organization's on-premises resources. For example, a user of the organization seeking to query a multi-terabyte data warehouse, rather than trying to execute the query and collect results on their laptop, may send to a cloud-based data warehouse hosted by a service provider, instructions that cause one or more servers associated with the cloud-based data warehouse to perform the query. This allows the results of the query to be accessed from a relatively underpowered computing device, such as via a user interface on the user's laptop. This may lower the processing burden on individual users' computers when conducting queries, lower the network bandwidth required for such queries (since data need not be downloaded to the user's computer), and in many cases, significantly speed up the overall query process.

Moreover, some data warehouse-as-a-service systems, such as SNOWFLAKE, developed by Snowflake, Inc. of Bozeman, Montana, may make use of virtual data warehouses. For instance, one or more servers may be used by such systems to instantiate virtual data warehouses for use in performing database queries. SNOWFLAKE, for example, provides features that allow for improvements over conventional data warehouse systems by enabling virtual data warehouses to be created, modified, and destroyed on demand. This allows multiple database queries to be executed against the data warehouse simultaneously, but separately, and further allows the appropriate resources to be allocated to each such query session. To preserve computing resources, an organization might configure and use multiple virtual data warehouses of different sizes—e.g., configured with varying amounts of computing resources. This might allow for larger, more significant, and/or time-sensitive queries to be executed against a first virtual data warehouse created and configured with an appropriate amount of computing resources to support such queries, while a second virtual data warehouse might be created and configured with a lesser degree of computing resources to support relatively smaller, less significant, and/or less time-sensitive queries.

As a caveat to data warehouse-as-a-service systems, because they are able to handle larger and more robust data operations, a user might submit a malformed or overly-broad data operation and, thereby, inadvertently cause the system to spend considerable time and computing resources attempting to execute and/or return results of the operation. Such user error and/or poor query formatting may be particularly costly, since the costs associated with data warehouse-as-a-service systems are often a function of time, computing resources used, or some combination thereof. Accordingly, a poorly-formatted query might end up costing an organization hundreds of dollars to execute. These costs can quickly add up as multiple users across departments or business units of the organization run queries against the organization's data warehouse. For instance, an organization may have multiple accounts (e.g., one or more for each of its departments and/or business units) with a data warehouse-as-a-service provider, and each such account may have its own set of users, databases, and even data warehouses. Tracking and managing costs is a crucial part of maintaining such services, but may present particular challenges when an organization's accounts are spread across different cloud regions and/or different cloud platforms, and when accounts associated with other organizations need to access such data.

Aspects described herein may address these and other problems, and may generally improve the ability for data hosted by a data warehouse-as-a-service system to be shared between different cloud platforms and cloud regions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to systems, apparatus, computer-readable media, and methods for sharing data within a cloud-based data warehousing system, such as provided by a data warehouse-as-a-service provider. Aspects described herein may enable the sharing of data between accounts within the cloud-based data warehousing system that are hosted by the service provider on different cloud platforms or in different cloud regions of a particular cloud platform, and where such accounts may be associated with different organizations. A native sharing protocol of the cloud-based data warehousing system may prohibit data sharing, within the data warehousing system, between accounts that are hosted on different cloud platforms or within different cloud regions of the same cloud platform. The native sharing protocol of the data warehousing system may further prohibit data replication, within the data warehousing system, between accounts associated with cloud-based data warehouses when those accounts are associated with different organizations.

Aspects described herein may overcome these challenges by the on-demand creation of one or more data collection accounts, which may be used to facilitate the sharing and replication of data in multi-cloud platform/region environments. For instance, a first computing device may receive a request for a first account, of a first cloud-based data warehouse, to access data associated with a client account. The first cloud-based data warehouse may comprise one or more databases for storing data received from a plurality of other cloud-based data warehouses, and the first cloud-based data warehouse may be located in a first cloud region. Based on determining that a first portion of the data associated with the client account is stored in a second cloud-based data warehouse located in the first cloud region and that a second portion of the data associated with the client account is stored in a third cloud-based data warehouse located in a second cloud region: first instructions may be sent, to a second computing device associated with the second cloud-based data warehouse, to share the first portion of the data with the first account. Additionally, second instructions may be sent, to a third computing device associated with the third cloud-based data warehouse, or share the second portion of the data with a second account of a fourth cloud-based data warehouse located in the second cloud region. Additionally, third instructions may be sent, to a fourth computing device associated with the fourth cloud-based data warehouse, to persist the second portion of the data shared with the second account and to replicate, to the first account of the first cloud-based data warehouse, the persisted second portion of the data. The first portion of the data shared from the second cloud-based data warehouse may be accessed, and the second portion of the data replicated from the fourth cloud-based data warehouse may be received. The first portion of the data shared from the second cloud-based data warehouse and the second portion of the data replication from the fourth cloud-based data warehouse may be stored in the first account of the first cloud-based data warehouse.

These features, along with others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
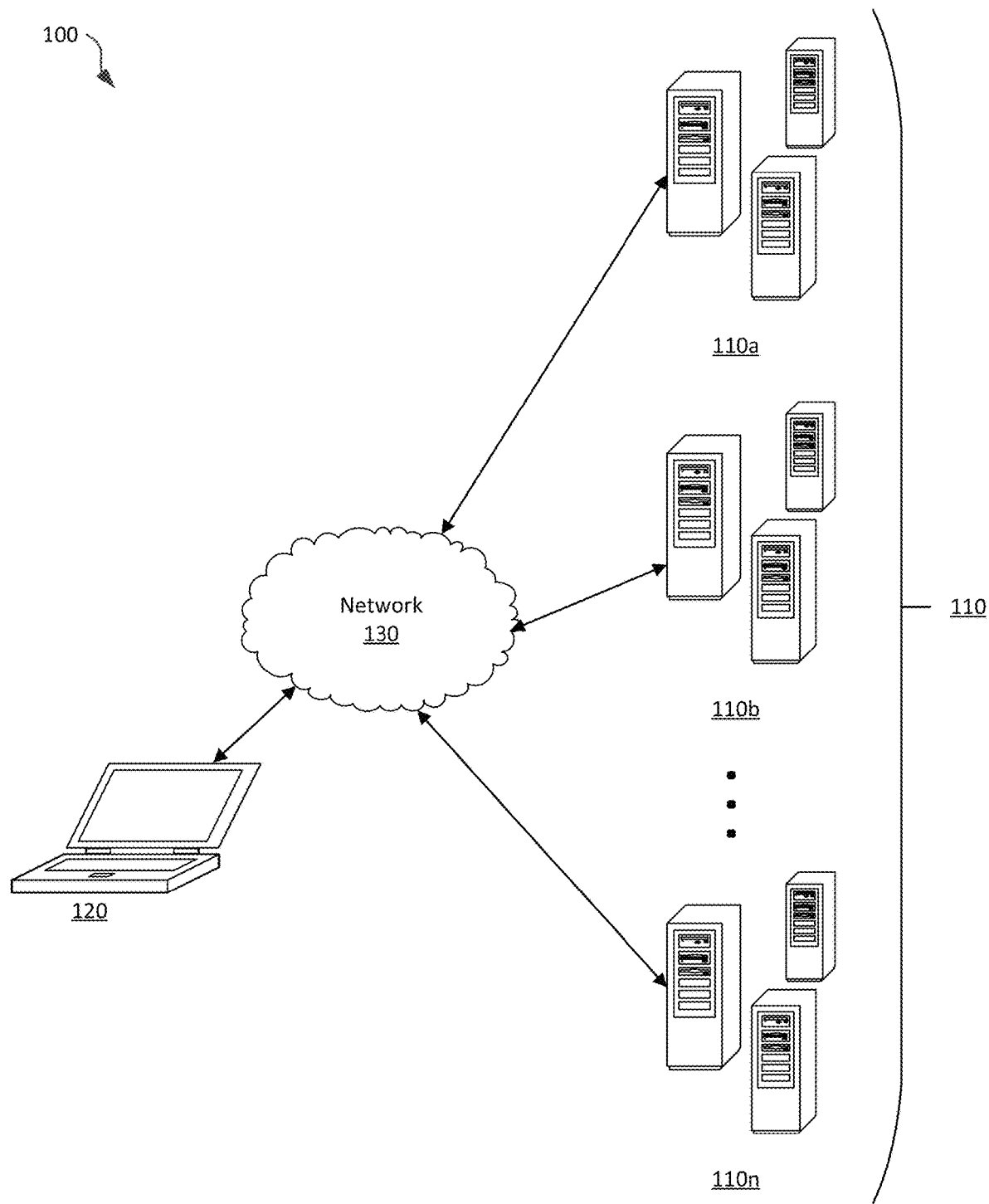
FIG. 1 shows an exemplary computing environment, in accordance with one or more aspects described herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may generally relate to methods and techniques for sharing data between accounts hosted by a data warehouse-as-a-service system. A service provider, such as SNOWFLAKE, may provide data warehousing services that run on a public cloud platform (e.g., AMAZON WEB SERVICES, MICROSOFT AZURE, GOOGLE CLOUD PLATFORM, and/or similar public cloud platforms). The service provider may provide its cloud-based data warehousing services to multiple organizations, and each organization may have multiple accounts with the service provider. The organizations may select which cloud platforms to have their data warehouse accounts hosted on. For instance, an organization may already use AMAZON WEB SERVICES for other of its cloud services and, thus, may choose to have their data warehousing accounts hosted there as well. The organization may further select a particular cloud region of the cloud platform on which their accounts should be hosted. The cloud region may refer to the geographical location or region of the world in which one or more of the cloud platform's data centers are located. That is, the cloud platform may have data centers in multiple geographical locations or regions of the world and the organization may choose which cloud region or regions to host its accounts on the data warehousing system. Such decisions may be based on a need to comply with data residency regulations and laws, a desire to have the data located proximate to the end users or a significant amount of the traffic, costs considerations, or the like. Organizations may, at times, choose to host multiple accounts across more than one cloud region, or even more than one cloud platform, to support multiple business units/functions or departments; as a means of replicating the data to decrease latency, for redundancy to serve as a fallback if one cloud region goes down, etc.; or for some other business purpose. Accordingly, any given organization may have multiple accounts spread across different cloud platforms and/or different cloud regions of a cloud-based data warehousing system.

In some cases, organizations may have relationships with one another and may need to share data across their respective accounts of the cloud-based data warehousing system. For instance, a first organization may have a relationship with one or more other organizations that regularly access the first organization's data stored in its cloud-based data warehouse. The one or more other organizations may be viewed as customers of the first organization and the first organization may provide a service to the customers, whereby the customers are permitted to access the first organization's data in its cloud-based data warehouse for a cost. The customers may access the first organization's data for use in their own businesses, to perform analytics, develop insights, and the like. Over time, the first organization may need to gather data from its customers to assist the customers in managing their costs and to provide the customers with reporting into such cost insights. In the case where the first organization and its customer are all using the same cloud-based data warehousing system, such a task should be a straightforward process since most cloud-based data warehousing systems permit data to be shared or exchanged between accounts of the data warehousing system. However, when such accounts are spread across different organizations, different cloud platforms, and different cloud regions, albeit using the same cloud-based data warehousing system, technical challenges arise.

Typically, such cloud-based data warehousing systems, such as SNOWFLAKE, enable data (e.g., database objects associated with databases of the account's data warehouse) to be shared between accounts. In SNOWFLAKE, for example, sharing may involve a first account providing, to one or more other accounts, permission to access select database objects in the first account's data warehouse. In SNOWFLAKE, such sharing is accomplished without copying or transferring any actual data between accounts. Instead, SNOWFLAKE enables the sharing through the use of metadata. The sharing (or source) account may create a new version of (sometimes referred to as a "share" of) one or more databases in their account and may grant permission to other accounts to access specific database objects within the database(s). The share may identify the privileges that grant access to the shared databases(s) and database objects, the schema for each of those database objects, and the accounts with which the database(s) and database objects are being shared. The one or more accounts with which the sharing account has shared data may access (e.g., consume) the share in their own account(s). Accessing (e.g., consuming) the share may involve the creation, in the consuming (or target) account(s), of a read-only database created from the share. In this way, all shared database objects may be accessible directly from the consuming account as if the account user were accessing his own database objects. As such, different organizations may easily share data across their respective accounts. For instance, a first organization may share data from one of its accounts with an account associated with a second organization. However, in some cloud-based data warehousing systems, such as SNOWFLAKE, the native sharing features prohibit data from being shared between accounts that are hosted on different cloud platforms or within different cloud regions of the cloud platform. This may then create issues when accounts need to share data hosted on different cloud platforms or regions of the cloud-based data warehousing system.

Conventionally, to work around this limitation, a first account wishing to share its data with a second account on a different cloud platform or region may make a physical copy of the data and provide the physical copy to the second account. In SNOWFLAKE, this may be accomplished by replication of the first account's data to the second account. For instance, the first (or source) account that wishes to share its data with the second (or target) account, hosted on a cloud platform or in a cloud region different from the source account, may cause its database or one or more database objects to be replicated to the target account. Replicating the source account's database or database objects may involve the creation of a replica of the database or database objects in the target account—and this, in turn, may cause a snapshot of various database objects and data to be transferred to the replica database in the target account. However, in some cloud-based data warehousing systems, such as SNOWFLAKE, native sharing features may prohibit the replication of shared data, as well as the replication of data across accounts belonging to different organizations. Therefore, conventionally, if a first account from Organization A wishes to share data, within the cloud-based data warehousing system, with a second account from Organization B, and the first and second accounts are hosted by the cloud-based data warehousing system on different cloud platforms or in different cloud regions, it might not be possible to share such data using the existing technical capabilities and native features of the cloud-based data warehousing system. Instead, the first account's data may need to be downloaded and transmitted, such as via file transfer protocol (FTP), to a computing device associated with Organization B, and an administrator at Organization B may need to upload the data back into to the cloud-based data warehousing system and into a data warehouse associated with the second account. This may become time-consuming, be prone to human error, use significant computing resources, and present security issues.

Accordingly, an improved method and system for sharing data between accounts, within a cloud-based data warehousing system, is disclosed herein. The disclosed system improves the functioning of computers by providing a mechanism for efficiently and securely sharing and/or moving data within a cloud-based data warehousing system, while minimizing processing times and the use of significant computing resources. The disclosed system could not be performed in the human mind or using pen-and-paper at least because the disclosed system is fundamentally rooted in computing technology, and, in particular, in the sharing and transmission of data within a cloud-based data warehousing system. While various business-related functions are referred to in the discussion of the disclosed system, those references are merely provided to give the reader a clear understanding of the practical manner in which the technology described herein might be used. The disclosed features provide a technical solution to a technical challenge associated with limitations in the data sharing and transmission functionality of certain cloud-based data warehousing systems.

Referring to FIG. 1, an exemplary computing environment 100 associated with a cloud-based data warehousing system is shown. The computing environment 100 may include one or more systems or computing devices, such as a cloud-based data warehousing system 110, one or more client devices 120, and a network 130.

The cloud-based data warehousing system 110 may be all or a portion of a data warehouse-as-a-service system provided by a service provider, such as SNOWFLAKE. The service provider may provide data warehousing services and/or resources, such as computing or storage resources, to one or more organizations, and such services and resources may be managed and operated by the service provider on behalf of the one or more organizations. The cloud-based data warehousing system 110 may comprise one or more computing devices, such as servers, which may store a plurality of data warehouses 110a-n. The data warehouses 110a-n may be managed and operated by the service provider on behalf of the one or more organizations. For instance, a data warehouse 110a may be managed and operated by the service provider on behalf of a first organization and a data warehouse 110b may be managed and operated by the service provider on behalf of a second, different organization. In some cases, more than one data warehouse 110a-n may be managed and operated on behalf of a single organization. The cloud-based data warehousing system 110, however, need not be a system provided by SNOWFLAKE, or other service provider system, and instead may be any type of data warehousing system implemented on cloud infrastructure.

Each of the data warehouses 110a-n may comprise one or more databases or other devices that store data. Each of the data warehouses 110a-n may be a single database or device, may be a collection of databases and/or devices. The data warehouse 110a-n may be structured and/or unstructured, such that, for example, a data warehouse may comprise a data lake. The data warehouses 110a-n may be or include, but need not be limited to, virtual data warehouses. The virtual data warehouse may be a set of logical views of one or more portions of one or more physical database objects, databases, or data warehouses. Such virtual data warehouses may be instantiated, resized, and/or destroyed on-demand. The virtual data warehouses may use varying amounts of computing resources—such as processing speed, storage, nodes and/or clusters, memory or the like. The data warehouses 110a-n may further be or include, but need not be limited to, relational databases, hierarchical databases, distributed databases, in-memory databases, flat file databases, XML databases, NoSQL databases, and/or graph databases. The data warehouses 110a-n may be a combination of any of the aforementioned databases and/or data warehouses. The data warehouses 110a-n may store data in a variety of formats and in a variety of manners. For example, a data warehouse may comprise textual data in a table, image data as stored in various file system folders, or any other type of data.

In some cases, the data warehouses 110a-n, although part of a single cloud-based data warehousing system 110, may be hosted on different cloud platforms, such as a public cloud platform (e.g., AMAZON WEB SERVICES, MICROSOFT AZURE, GOOGLE CLOUD PLATFORM, and/or similar public cloud platforms). In this case, the physical devices on which the data warehouses 110a-n are maintained may be devices owned and operated by the cloud platform provider (e.g., AMAZON, MICROSOFT, GOOGLE, or the like). For instance, the data warehouse 110a may be hosted on a first cloud platform, such as GOOGLE CLOUD PLATFORM, while the data warehouse 110b may be hosted on a second cloud platform, such as AMAZON WEB SERVICES. Further, the data warehouses 110a-n may be hosted on the same cloud platform, but within different regions of the cloud platform. The different regions may refer to different geographical locations or regions of the world in which a particular cloud platform has located one or more of its data centers and physical devices. For instance, the data warehouse 110b may be hosted in a first region of AMAZON WEB SERVICES, such as US East Region, while a data warehouse 110c, also hosted by AMAZON WEB SERVICEs, may be hosted in a second and different region, such as US West Region.

The one or more client devices 120 may be one or more devices associated with one or more organizations or end users of the one or more organizations. The one or more client devices 120 may be used to access resources, such as cloud-based services, provided by the cloud-based data warehousing system 110. The one or more client devices 120 may be configured to communicate with and/or connect to the cloud-based data warehousing system 110, via the network 130. The one or more client devices 120 may each comprise one or more applications for communicating with the cloud-based data warehousing system 110. For instance, the one or more client devices 120 may have installed thereon a web browser or other application, which may be used to send requests to, such as database queries, and/or receive data from, such as query results, from one or more computing device associated with the cloud-based data warehousing system 110. The one or more client devices 120 may further process and display data received from the cloud-based data warehousing system 110. The one or more client devices 120 may be any type of computing device or combination of devices capable of performing the particular functions disclosed herein. For example, the one or more client devices 120 may be and/or include servers, desktop computers, laptop computers, tablet computers, smart phones, fitness devices, or the like, which may include one or more processors, memories, communication interfaces, storage devices, and/or other components. The one or more client devices 120, in some instances, may be or include special-purpose computing devices configured to perform the functions disclosed herein.

The network 130 may connect one or more computing devices, such as the one or more client devices 120, to the cloud-based data warehousing system 110. The network 130 may include one or more of local area networks (LANs), wide area networks (WANs), virtual private networks (VPNs), the Internet, wireless telecommunication networks, and/or any other communication network or combination thereof. The existence of any of various network protocols such as TCP/IP, Ethernet, FTP, HTTP, and the like, and of various wireless communication technologies such as GSM, CDMA, WiFi, and LTE, is presumed, and the various computing devices described herein may be configured to communicate, via the network 130, using any of these network protocols or technologies. It will be further appreciated that the network connections shown are illustrative and any means of establishing a communications link between the computers may be used.

Figure 2:
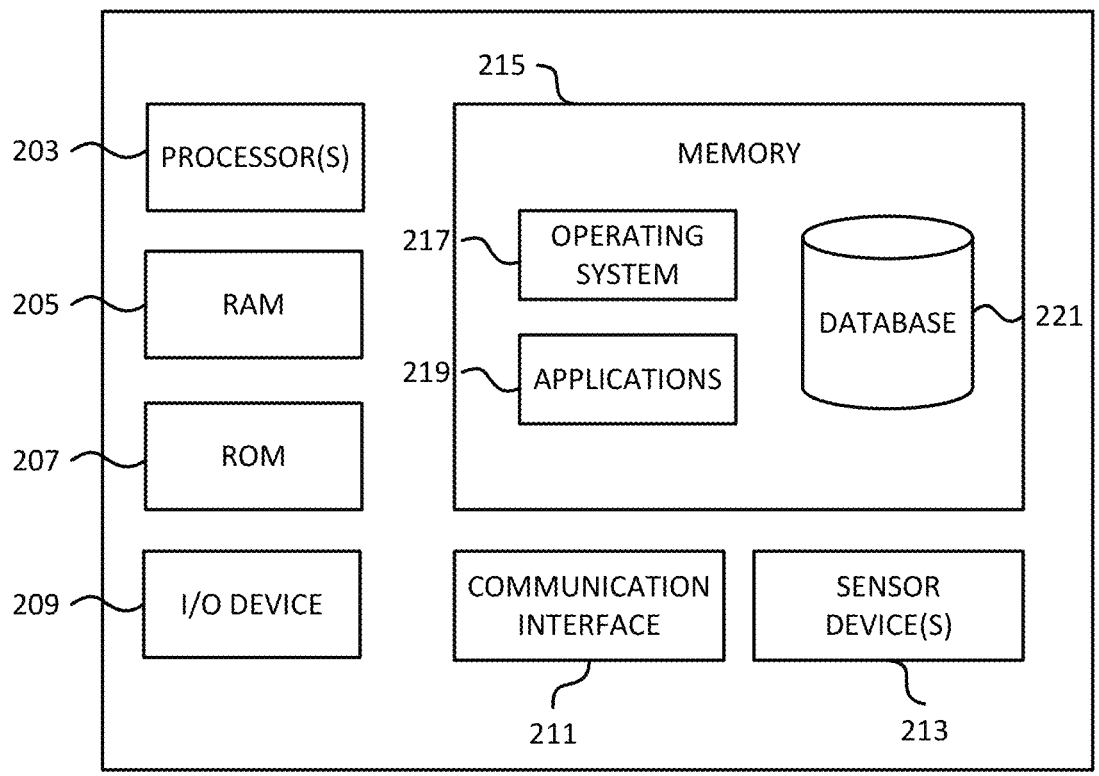
FIG. 2 shows an exemplary computing device, in accordance with one or more aspects described herein.

Referring to FIG. 2, an exemplary computing device 200, which may be used in accordance with one or more aspects described herein, is shown. The computing device 200 may include or incorporate any one of the devices of FIG. 1, such as one or more computing devices associated with the cloud-based data warehousing system 110 or the one or more client devices 120. The computing device 200 may represent, be incorporated in, and/or include various devices such as a desktop computer, a computer server, a mobile device, a laptop computer, a tablet computer, a smart phone, a fitness device, and/or any other type of data processing device.

The computing device 200 may include one or more components, such as one or more processors 203, a random-access memory (RAM) 205, a read-only memory (ROM) 207, an input/output (I/O) device 209, a communication interface 211, one or more sensor devices 213, and a memory 215. The computing device 200 may include one or more additional or different components.

The one or more processors 203 may be configured to control overall operation of the computing device 200 and its associated components. A data bus (not shown) may interconnect the one or more processors 203, the RAM 205, the ROM 207, the I/O device 209, the communication interface 211, the one or more sensor devices 211, and/or the memory 215. The one or more processors 203 may include a single central processing unit (CPU), which may be a single-core or multi-core processor, or may include multiple CPUs. The one or more processors 203 and associated components may control the computing device 200 to execute a series of computer-readable instructions to perform some or all of the processes disclosed herein. Although not shown in FIG. 2, various elements within the memory 215 or other components in the computing device 200, may include one or more caches, for example, CPU caches used by the one or more processors 203, page caches used by operating system 217, disk caches of a hard drive, and/or database caches used to cache content from database 221. For embodiments including a CPU cache, the CPU cache may be used by the one or more processors 203 to reduce memory latency and access time. The one or more processors 203 may retrieve data from or write data to the CPU cache rather than reading/writing to the memory 215, which may improve the speed of these operations. In some examples, a database cache may be created in which certain data from the database 221 may be cached in a separate smaller database in a memory separate from the database 221, such as in the RAM 205 or on a separate computing device. For instance, in a multi-tiered application, a database cache on an application server may reduce data retrieval and data manipulation time by not needing to communicate over a network with a back-end database server. These types of caches and others may be included in some cases, and may provide potential advantages in certain implementations of devices, systems, and methods described herein, such as faster response times and less dependence on network conditions when transmitting and receiving data.

The input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output.

The communication interface 211 may include one or more transceivers, digital signal processors, and/or additional circuitry and software for communicating via a network, wired or wireless, using any protocol as described herein.

The one or more sensor devices 213 may include one or more of an accelerometer, a gyroscope, a GPS device, a biometric sensor, a proximity sensor, an image capturing device, a magnetometer, etc.

The memory 215 may store software to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random-access memory (RAM) 205, read-only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Although various components of computing device 200 are described separately, functionality of the various components may be combined and/or performed by a single component and/or multiple computing devices in communication without departing from the invention.

Figure 3:
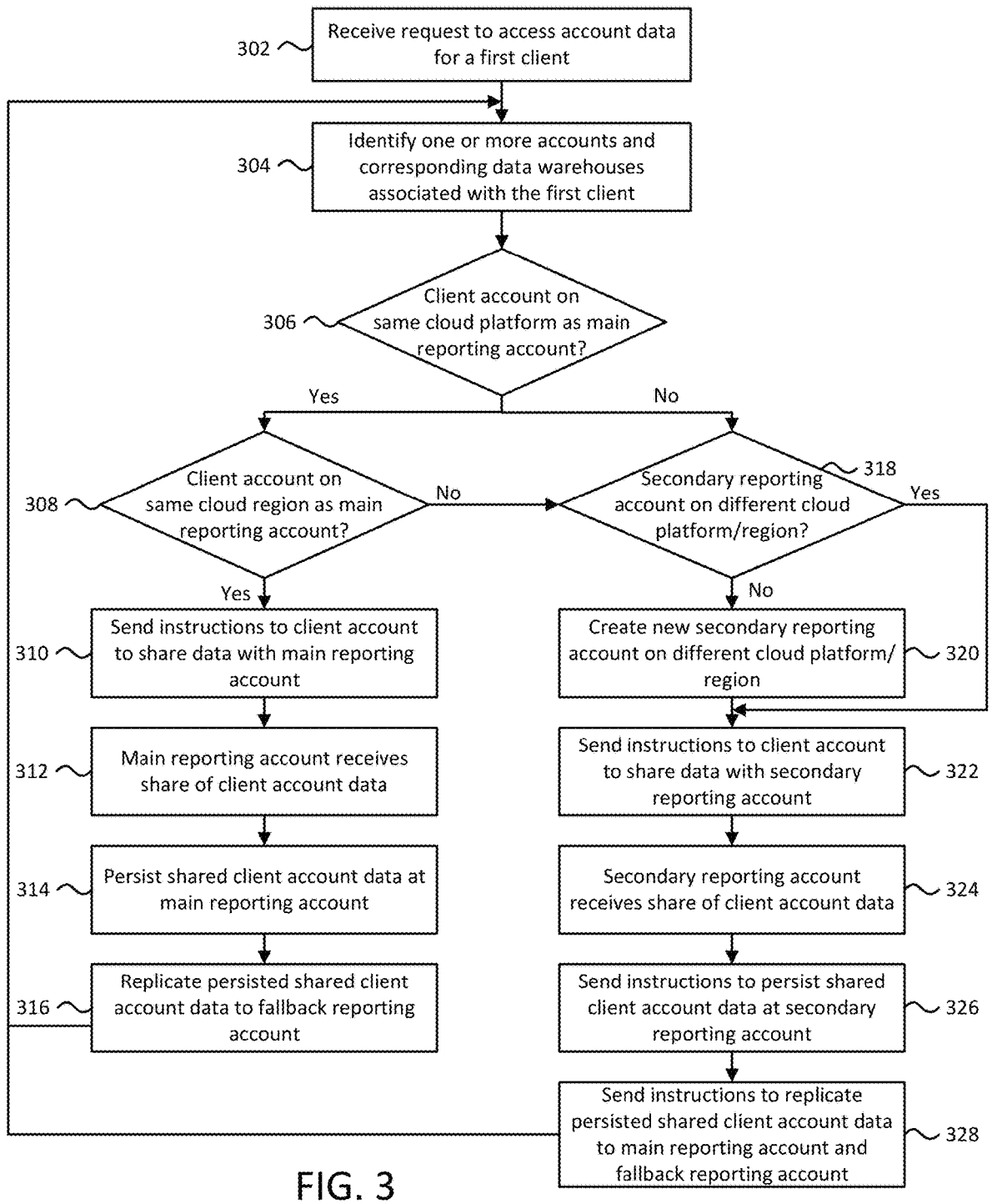
FIG. 3 shows an exemplary flowchart for performing a data sharing method, in accordance with one or more aspects described herein.
Figure 4A:
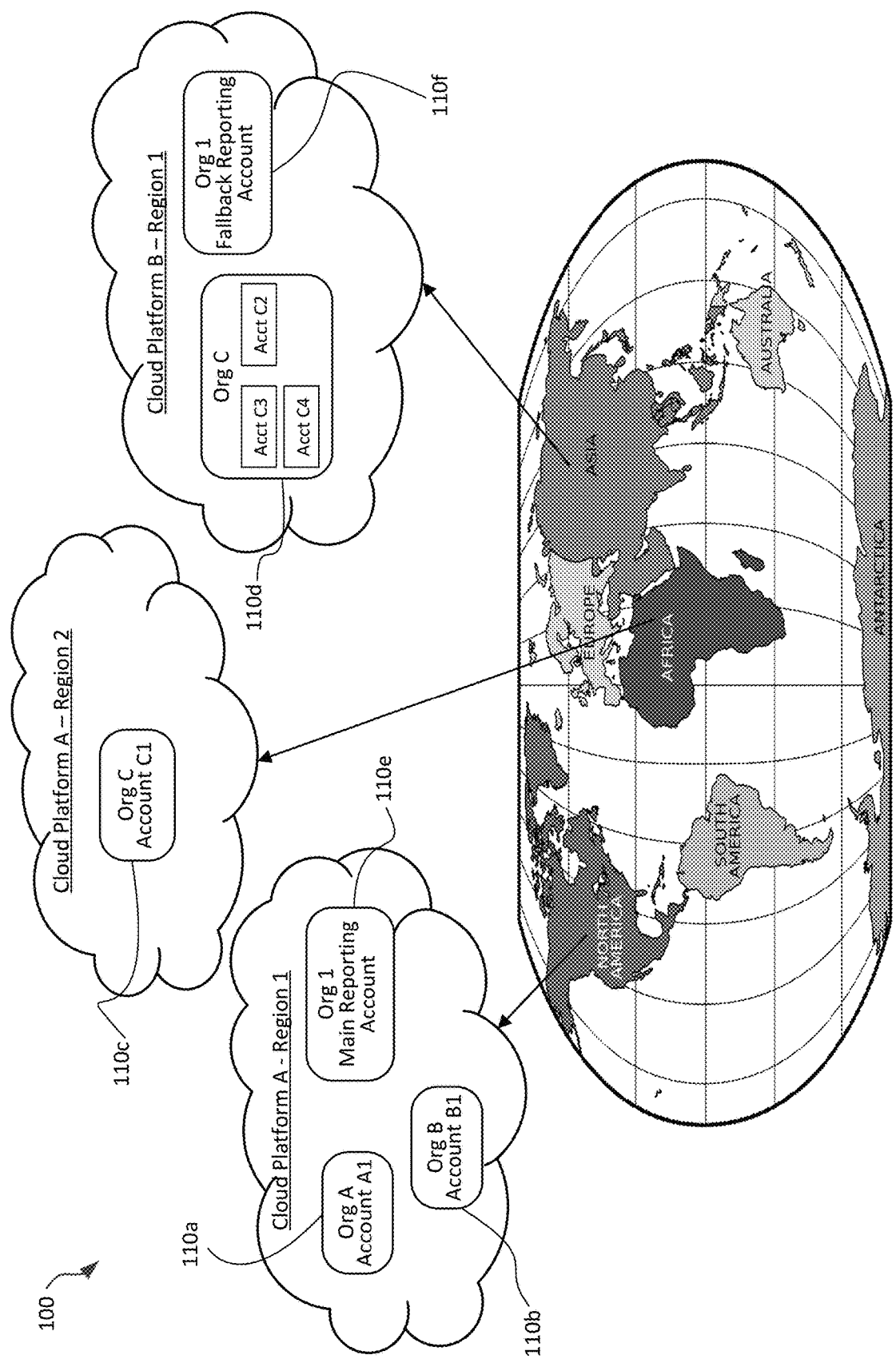
FIG. 4A illustrates an exemplary cloud-based data warehousing system during the data sharing method described in FIG. 3.

FIG. 3 shows an exemplary flowchart for performing a data sharing method, in accordance with one or more aspects described herein. FIG. 4A illustrates a cloud-based data warehousing system, such as the cloud-based data warehousing system 110 described with respect to the data sharing method of FIG. 3.

The sharing method described with respect to FIG. 3 may be a method used by the cloud-based data warehousing system 110. The cloud-based data warehousing system 110 may comprise the SNOWFLAKE data architecture, for example. The method of FIG. 3 may be implemented by one or more computing devices associated with the cloud-based data warehousing system 110. In the example method described with respect to FIG. 3, a first organization may maintain one or more accounts with the cloud-based data warehousing system 110. The one or more accounts may provide the first organization with access to the one or more data warehouses 110a-n provided and managed by the cloud-based data warehousing system 110 for storing the first organization's data.

The first organization may further provide a service to one or more other users having accounts with the cloud-based data warehousing system 110. For instance, the first organization may provide to these other users, for a cost, access to the first organization's data in the one or more data warehouses 110a-n of the cloud-based data warehousing system 110. These other users may be one or more other organizations different from the first organization. For instance, with the first organization may provide a service to Organization A, Organization B, and Organization C, and these organizations may be clients of the first organization. These client organizations may, using their own accounts, consume data associated with one or more of the accounts associated with the first organization. For instance, Organization A may have an account, such as Account A1, that it uses to consume data from the first organization; Organization B may also have an account, such as Account B1, that it uses to consume data from the first organization; and Organization C may have more than one account, such as Accounts C1, C2, C3, and C4, that it uses to consume data from the first organization.

The client organizations, such as Organizations A, B, and C, may access the first organization's data for use in their own businesses, to perform analytics, develop insights, and the like. The first organization may gather data from the client organizations' accounts, such as Accounts A1, B1, C1, C2, C3, and C4 at predetermined time periods to perform analysis and reporting. For example, the first organization may collect certain data from the client organizations' accounts related to the clients' consumption and usage of the first organization's data, and the first organization may use the collected data to assist the clients in managing their costs and usage associated with consumption of the first organizations' data. As such, one of the accounts maintained by the first organization may be a reporting account, such as a main reporting account, used for collecting such data from the client accounts. In some cases, the first organization may also maintain a fallback reporting account, which may serve as a backup or a fallback account in the event of a failure at the main reporting account, or at the cloud platform and/or the cloud region that hosts the main reporting account. In some cases, the first organization's main reporting account (or fallback reporting account) and the one or more of the client accounts may be associated with one or more data warehouses 110a-n that are hosted on the same cloud region of the same cloud platform, and in other cases the main reporting account (or the fallback reporting account) and the client accounts may be associated with one or more data warehouses 110a-n that are hosted on different cloud regions and/or cloud platforms.

For example, referring to FIG. 4A, Organization A's Account A1 (e.g., Org A Account 1) may be associated with data warehouse 110a, Organization B's Account B1 (e.g., Org B Account 1) may be associated with data warehouse 110b, and the first organization's main reporting account (e.g., Org Main Reporting Account) may be associated with data warehouse 110e. In this example, the data warehouses 110a, 110b, and 110e may all be hosted on Cloud Platform A in Region 1. As another example, Organization C's Account C1 (e.g., Org C Account C1) may be associated with data warehouse 110c and may be hosted on the same cloud platform, e.g., Cloud Platform A, as the data warehouse 110e associated with the first organization's main reporting account, but may be hosted in a different cloud region of that cloud platform, e.g., Region 2. As a further example, Organization C's Accounts C2 (e.g., Acct C2), C3 (e.g., Acct C3), and C4 (e.g., Acct C4) may be associated with data warehouse 110d and may be hosted on a different cloud platform from the data warehouse 110e associated with the first organization's main reporting account. For example, the data warehouse 110d may be hosted on Cloud Platform B. The first organization's fallback reporting account (e.g., Org 1 Fallback Reporting Account) may be associated with data warehouse 110f and may also be hosted on the Cloud Platform B.

The first organization may need to collect, using its main reporting account, data from Organizations A, B, and C's Accounts A1, B1, C1, C2, C3, and/or C4 to perform one or more analytics, reporting, or other functions. For example, referring to FIG. 3, at step 302, a request may be received by a first computing device associated with the data warehouse 110e associated with the main reporting account, for the main reporting account to access data associated with one or more accounts associated with the first organization's client organizations. For instance, a request may be received for the main reporting account to access data associated with accounts belonging to a first client. The first client may be Organization A, B, or C, for example.

At step 304, the first computing device may identify one or more accounts associated with the first client and may further identify the one or more data warehouses 110a-n associated with each of the one or more accounts. For instance, the first computing device may store or access information indicating one or more accounts associated with the first client and the corresponding one or more data warehouses 110a-n associated with the client's one or more accounts. The information may further indicate, for each of the data warehouses 110a-n associated with the first client's one or more accounts, the cloud platform and the cloud region on which the data warehouse 110a-n is hosted. The information may include a data element indicating whether the account is a primary account or a secondary account (or sub account). That is, in some cases, the first client may maintain multiple accounts on a given data warehouse 110a-n. In such cases, one of the multiple accounts may be identified as a primary account, while the others may be identified as secondary accounts. For instance, referring to FIG. 4A, Organization C may maintain multiple accounts on the data warehouse 110d hosted in Region 1 of Cloud Platform B, e.g., Accounts C2, C3, and C4. One of these accounts, such as Account C2, may be identified as a primary account and the remaining accounts, such as C3 and C4, may be identified as secondary accounts. Primary accounts may be used to consolidate data and coordinate sharing between the client's multiple accounts hosted on a particular cloud region/platform and other accounts outside of that cloud region/platform.

At step 306, the first computing device may determine whether the first client has an account on a data warehouse 110a-n that is hosted on the same cloud platform as the data warehouse 110e associated with the main reporting account. This determination may be necessary in view of the native sharing functionality provided by the cloud-based data warehousing system 110. Typically, accounts may directly share data through the cloud-based data warehousing system 110 when those accounts are hosted on the same cloud platform and in the same cloud region. However, in some systems, such as SNOWFLAKE, the native functionality of the system may prohibit the sharing of data to an account hosted on a different cloud region and/or cloud platform. This technical limitation might not be resolved through the use of replication from one account to another, within the cloud-based data warehousing system 110, since these systems may further prohibit the replication of data to accounts associated with different organizations. Accordingly, the first computing device may determine whether any of the first client's accounts are associated with a data warehouse 110a-n hosted on the Cloud Platform A, e.g., the same cloud platform as the data warehouse 110e associated with the main reporting account. If one of the client's account, such as a first client account, is associated with a data warehouse 110a-n that is hosted on the same cloud platform as the data warehouse 110e associated with the main reporting account, then the method may proceed to step 308 to further determine whether the accounts are hosted in the same cloud region, otherwise the method may proceed to step 318.

If it was determined that a first client account (or multiple client accounts) is associated with a data warehouse 110a-n hosted on the same cloud platform as the data warehouse 110e associated with the main reporting account, then at step 308, the first computing device may determine whether the data warehouse 110a-n associated with the first client account is also hosted in the same cloud region as the data warehouse 110e associated with the main reporting account. For instance, the first computing device may determine whether the data warehouse 110a-n associated with the first client account is hosted on Region 1 of Cloud Platform A. If the first client account is associated with a data warehouse 110a-n hosted on the same cloud region as the data warehouse 110e associated with the main reporting account, then the method may proceed to step 310, otherwise the method may proceed to step 318.

If it was determined that the first client account (or multiple client accounts) is associated with a data warehouse 110a-n hosted on the same cloud region as the data warehouse 110e associated with the main reporting account, e.g., on Region 1 of Cloud Platform A, then at step 310, the first computing device may send, to a computing device associated with the data warehouse 110a-n associated with the first client account, instructions for the first client account to share its data with the main reporting account. Further, when the first client has multiple accounts that are associated with the same data warehouse 110a-n, the first computing device may identify one of those accounts as the primary account based on the primary account flag (identified at step 304), and the instructions may indicate for only the flagged primary account to share its data with the main reporting account. In this case, the instructions may first cause the remaining accounts, e.g., the secondary accounts, to share their respective data with the primary account, and after the data associated with the secondary accounts is shared to the primary account, the instructions may cause the primary account to share its data and the shared data from the secondary accounts with the main reporting account.

The instructions may further indicate one or more warehouse resources or objects (e.g., maintained in the date warehouse 110a-n associated with the first client account) that are requested for sharing. For instance, the instructions may indicate one or more schemas, databases, tables, views, stored procedures, functions, columns in a database table, or the like to be shared with the main reporting account. Sharing may involve the first client account providing permission for the main reporting account to access the requested database objects maintained in the first client account's data warehouse 110a-n. Such sharing may be accomplished without copying or transferring any actual data between accounts. For example, the sharing may be enabled via the architecture of the cloud-based data warehousing system 110, such as through the use of metadata.

At step 312, in response to the instructions to share the first client account's data with the main reporting account, the data warehouse 110e may receive a "share" of the data associated with the first client account. In this case, the first client account (e.g., the sharing or source account) may create a share of one or more of their data warehouse objects (e.g., maintained in the data warehouse 110a-n) and may grant permission to the main reporting account to access the requested data warehouse objects (e.g., as requested in the instructions sent at step 310) within the data warehouses 110a-n. Receiving the share may involve the automatic creation, in the data warehouse 110e associated with the main reporting account, of a read-only database created from the share. Once created, all of the shared data warehouse objects may be accessible from the main reporting account.

At step 314, the first computing device may persist, such as cache or store, the shared data in the data warehouse 110e associated with the main reporting account. The data may be persisted permanently or temporarily. For instance, the persisted data may be stored in a database table of the data warehouse 110e associated with the main reporting account. Persisting the data in this manner may be important because native functionality of the cloud-based data warehousing system 110, such as SNOWFLAKE, may prohibit the sharing of data to an account hosted on a different cloud region and/or cloud platform and may further prohibit the replication of a share. The first organization, however, may need to copy or otherwise transmit the shared data to another reporting account maintained by the first organization, such as on another cloud region or another cloud platform, to serve as a backup or a fallback reporting account in the event of a failure at the main reporting account, or at the cloud platform and/or the cloud region that hosts the main reporting account.

At step 316, the first computing device may cause the persisted shared data to be replicated to another account associated with a data warehouse 110a-n hosted on a different cloud region or different cloud platform from the cloud region/platform that hosts the data warehouse 110e associated with the main reporting account. In this case, the persisted data may be replicated to a secondary and/or fallback reporting account associated with the data warehouse 110a-n hosted on the different cloud region or cloud platform, for instance on the Region 2 of the Cloud Platform A or Region 1 of the Cloud Platform B. After replicating the data to the fallback reporting account, the method may return to step 306 to process any additional identified accounts associated with the first client. If there are no additional accounts, the method may end.

If it was determined that the data warehouse 110a-n associated with the first client account is not hosted on the same cloud platform as the data warehouse 110e associated with the main reporting account (such as at step 306) or is not hosted on the same cloud region as the data warehouse 110e associated with the main reporting account (such as at step 308), then at step 318, the first computing device may determine whether a reporting account, such as a secondary reporting account, associated with the first organization exists on the different cloud platform or different cloud region where the data warehouse 110a-n associated with the first client account is hosted. For instance, the first organization may store or access information indicating cloud platforms and cloud regions where the first organization has reporting accounts.

The first organization may maintain one or more secondary reporting accounts, other than the main reporting account, on different cloud platforms and/or cloud regions. These secondary reporting accounts may be used as a backup and/or fallback account in the event the main reporting account, or the cloud platform or cloud region on which it is hosted, is down. The secondary reporting accounts, additionally or alternatively, may have been previously created in accordance with aspects described herein. The information indicating the secondary reporting accounts on the different cloud platform or different cloud region may further indicate information identifying the specific data warehouses 110a-n associated with the secondary reporting accounts. If it is determined that there is no secondary reporting account on the different cloud platform or the different cloud region, the method may proceed to step 320, otherwise the method may proceed to step 322.

If it was determined that there is currently no secondary reporting account on the different cloud platform or the different cloud region where the first client account is hosted, then at step 320, the first computing device may cause a new secondary reporting account to be created on that cloud platform or cloud region. This may be necessary as a result of technical limitations associated with the native features of the cloud-based data warehousing system 110, such as SNOWFLAKE, which may otherwise prohibit the sharing of data, within the cloud-based data warehousing system 110, to an account hosted on a different cloud platform or cloud region, or may prohibit the replication of data to an account associated with a different organization. Accordingly, to facilitate the sharing and/or replication of data in such cases, a new secondary reporting account may be created, on-demand, on the different cloud platform and/or cloud region where the first client account is hosted when a reporting account does not currently exist there. The first computing device may execute a script that may cause the new reporting account to be created and configured on the different cloud platform or the different cloud region where the first client account is hosted. Creating and configuring the new reporting account may further involve the instantiation and configuration of a new virtual data warehouse 110a-n to be associated with the new reporting account. The script may include configuration information indicating computing resources that should be associated with the new data warehouse 110a-n, for example, a quantity of memory, a processor speed, a number of nodes and/or clusters, or the like. The configuration information may further indicate a duration of time for which the new data warehouse 110a-n should be available—such as an hour, a day, a week, indefinitely, etc. After the duration of time the data manager computing device 301 may cause the new data warehouse 110k to be dropped or suspended. Additionally or alternatively, the configuration may be based on information included in the request, such as information indicating an amount of data to be shared. As part of the configuration of the new data warehouse 110a-n, the script may further cause the creation of one or more databases, schemas, and/or database objects, in the new data warehouse 110a-n, to support the first organization's data collection function. For instance, the one or more created databases may be used to store data collected from the first client account.

If it was determined that a secondary reporting account on the different cloud platform or the different cloud region where the first client account is hosted already exists (at step 318), or if a new secondary reporting account was created (at step 320), then at step 322, the first computing device may send, to a computing device associated with the data warehouse 110a-n associated with the first client account, instructions for the first client account to share its data with the secondary reporting account. When the client has multiple accounts that are associated with the same data warehouse 110a-n, the first computing device may identify, based on the primary account flag, the primary account and the instructions may indicate for only the flagged primary account to share its data with the secondary reporting account. In this case, the instructions may first cause the secondary accounts to first to share their respective data with the primary account and, after the data associated with the secondary accounts is shared to the primary account, the instructions may cause the primary account to share its data and the shared data from the secondary accounts with the secondary reporting account.

The secondary reporting account may be the newly-created secondary reporting account that is hosted on the same cloud platform or cloud region as the first client account or may be a fallback reporting account or another previously-created secondary reporting account. The instructions may further indicate one or more data warehouse objects (e.g., maintained in the date warehouse 110a-n associated with the first client account) that are requested for sharing. For instance, the instructions may indicate one or more schemas, databases, tables, views, stored procedures, functions, columns in a database table, or the like to be shared with the secondary data reporting account.

At step 324, in response to the instructions to share the first client account's data with the secondary reporting account, the data warehouse 110a-n associated with the secondary reporting account may receive a "share" of the data associated with the first client account. In this case, the first client account (e.g., the sharing or source account) may create a share of one or more of their data warehouse objects (e.g., maintained in the data warehouse 110a-n) and may grant permission to the secondary reporting account to access the requested data warehouse objects (e.g., as requested in the instructions sent at step 322) within the data warehouse 110a-n. The shared data warehouse objects may, as a result, be accessible from the secondary reporting account.

At step 326, the first computing device may send instructions to a computing device associated with the data warehouse 110a-n associated with the secondary reporting account, to persist the shared data in the data warehouse 110a-n associated with the secondary reporting account. For instance, the persisted data may be stored in a database table of the data warehouse 110g associated with the secondary reporting account.

At step 328, the first computing device may send instructions to the computing device associated with the secondary reporting account, to replicate the persisted shared data to the data warehouse 110e associated with the main reporting account. In this way, aspects of this disclosure may allow for the replication, within the cloud-based data warehousing system 110, of the client account's data to the first organization's account, despite the fact that the underlying data is associated with a different organization, thereby overcoming a limitation of native features of a cloud-based data warehousing system 110, such as SNOWFLAKE, which conventionally might prohibit such data replication. In some cases, the instructions may further indicate that the persisted shared data should further be replicated to one or more fallback reporting accounts associated with the first organization.

After replicating the data to the main reporting account and/or the fallback reporting account, the method may return to step 306 and steps 306-328 may be repeated for each identified account associated with the first client. After each of the accounts has been processed, the method may end. In some cases, the data collected from the client accounts may be aggregated and the aggregated data may be stored in the one or more database tables of the data warehouse 110e for use in various analytic and reporting functions of the organization.

The method of FIG. 3 is further described with reference to FIGS. 4A-4L.

Figure 4B:
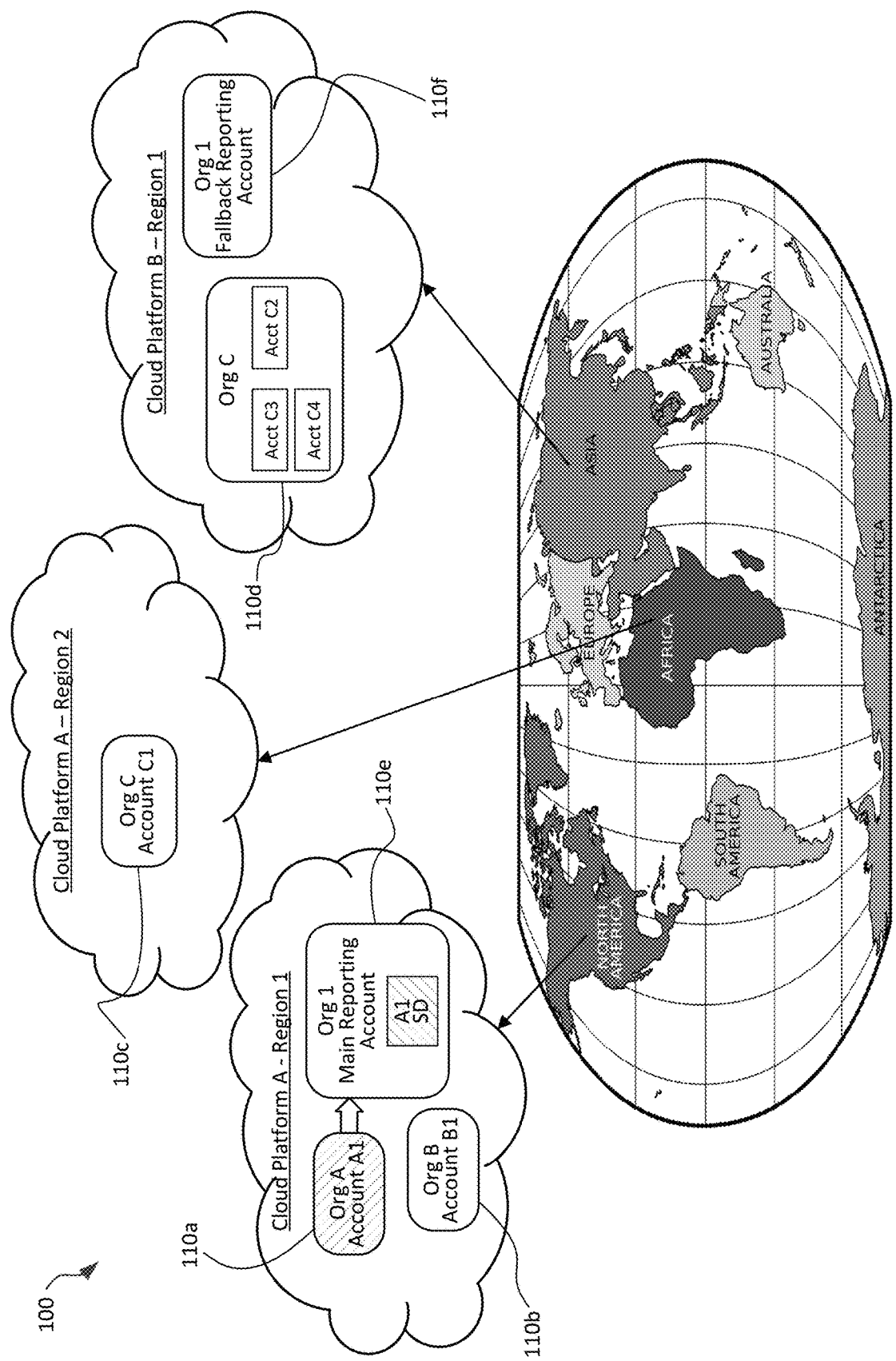
FIG. 4B illustrates an exemplary cloud-based data warehousing system during the data sharing method described in FIG. 3.
Figure 4C:
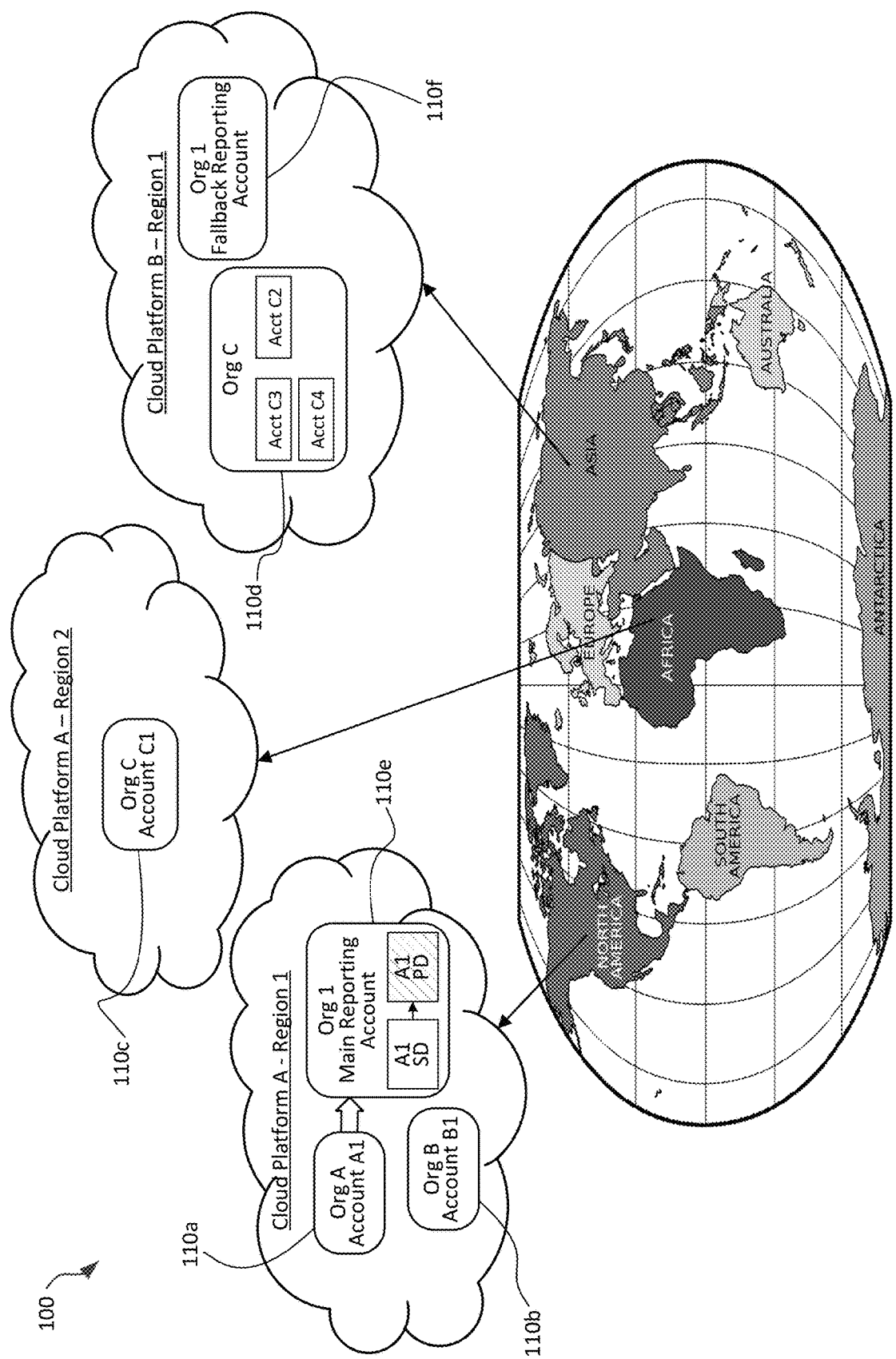
FIG. 4C illustrates an exemplary cloud-based data warehousing system during the data sharing method described in FIG. 3.
Figure 4D:
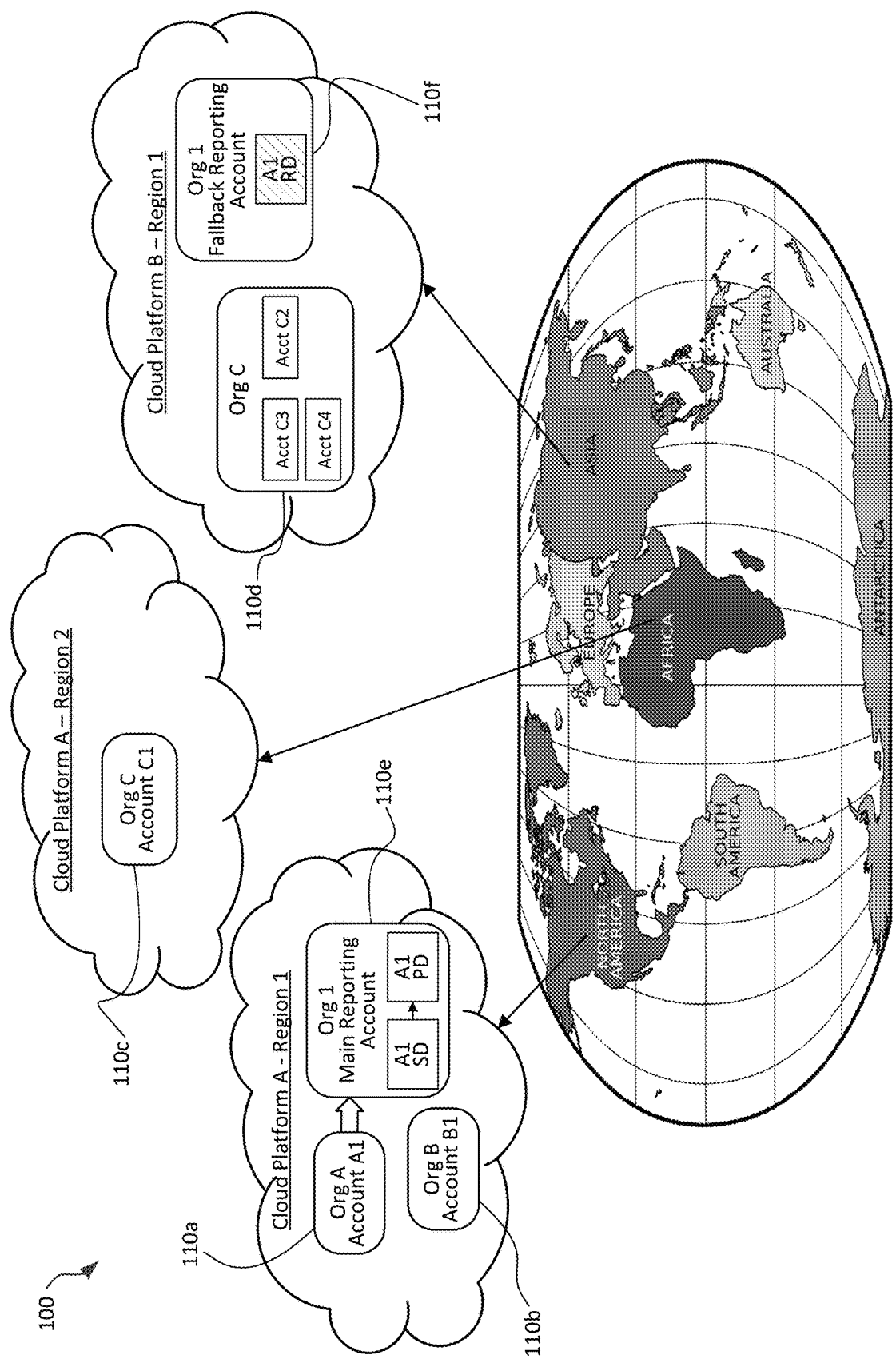
FIG. 4D illustrates an exemplary cloud-based data warehousing system during the data sharing method described in FIG. 3.

By way of example, and referring to FIGS. 4A-4D, if the request at step 302 was to access account data for Organization A, then at step 304, Account A1 may be identified as an account associated with Organization A, and data warehouse 110a may be identified as associated with Account A1. It may further be determined that the data warehouse 110a associated with Account A1 is hosted on Region 1 of Cloud Platform A, as shown in FIG. 4A. Accordingly, at steps 306 and 308, it may be determined that Account A1 is hosted on the same cloud platform and the same cloud region as the main reporting account, as shown in FIG. 4A. In this case, at step 310, instructions may be sent to a computing device associated with the data warehouse 110a for Account A1 to share data from one or more of its data warehouse objects with the main reporting account. At step 312, Account A1 may share its data with the main reporting account and the data warehouse 110e associated with the main reporting account may receive a share of the data, as shown in FIG. 4B. At step 314, the main reporting account may persist the data shared from Account A1, as shown in FIG. 4C. At step 316, the persisted data may be replicated to the fallback reporting account associated with data warehouse 110f hosted on Region 1 of Cloud Platform B, as shown in FIG. 4D. After replicating the data to the fallback reporting account, the method may return to step 306 to process any additional identified accounts associated with the Organization A. If there are no additional accounts, the method may end.

Figure 4E:
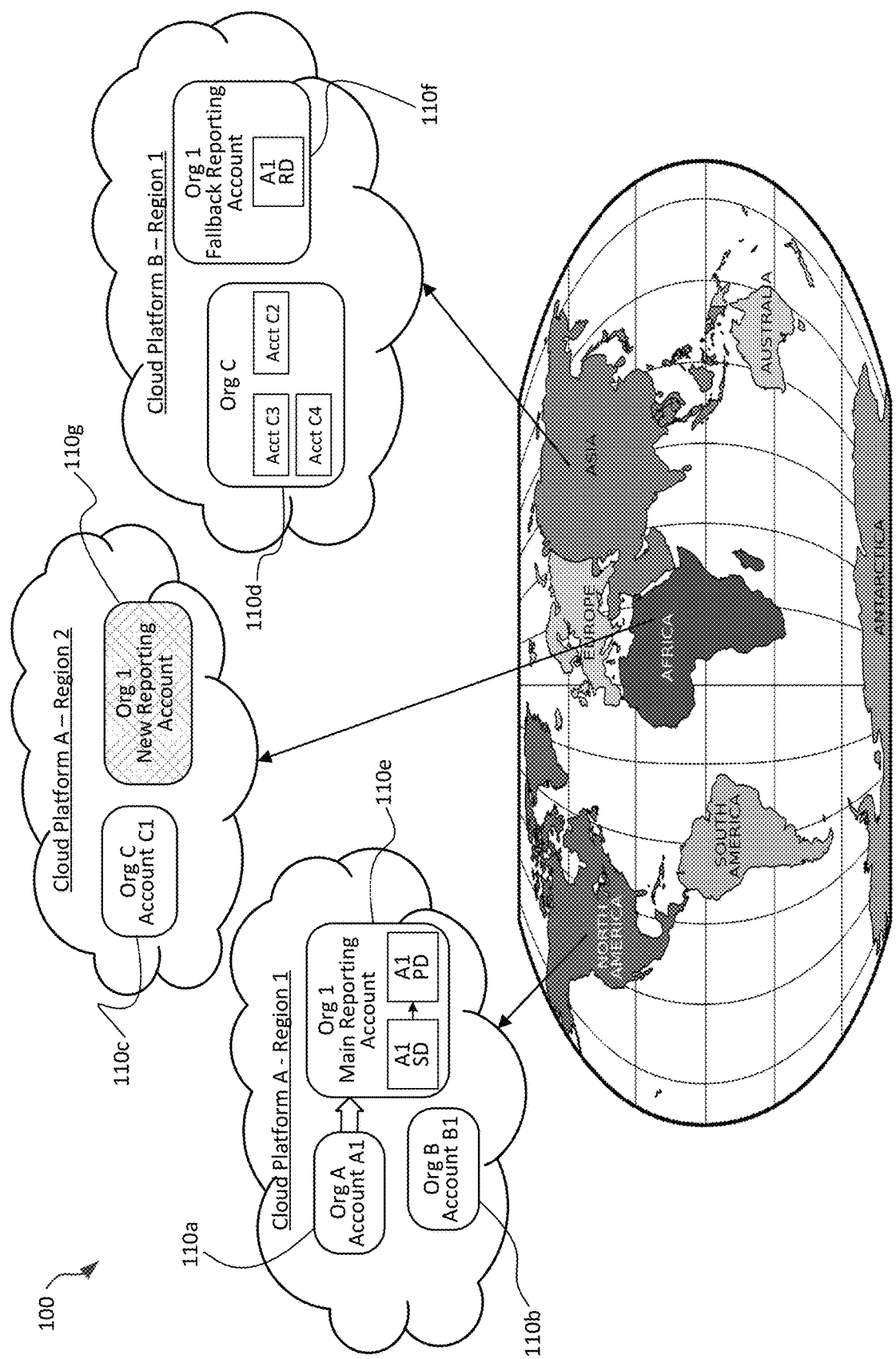
FIG. 4E illustrates an exemplary cloud-based data warehousing system during the data sharing method described in FIG. 3.
Figure 4F:
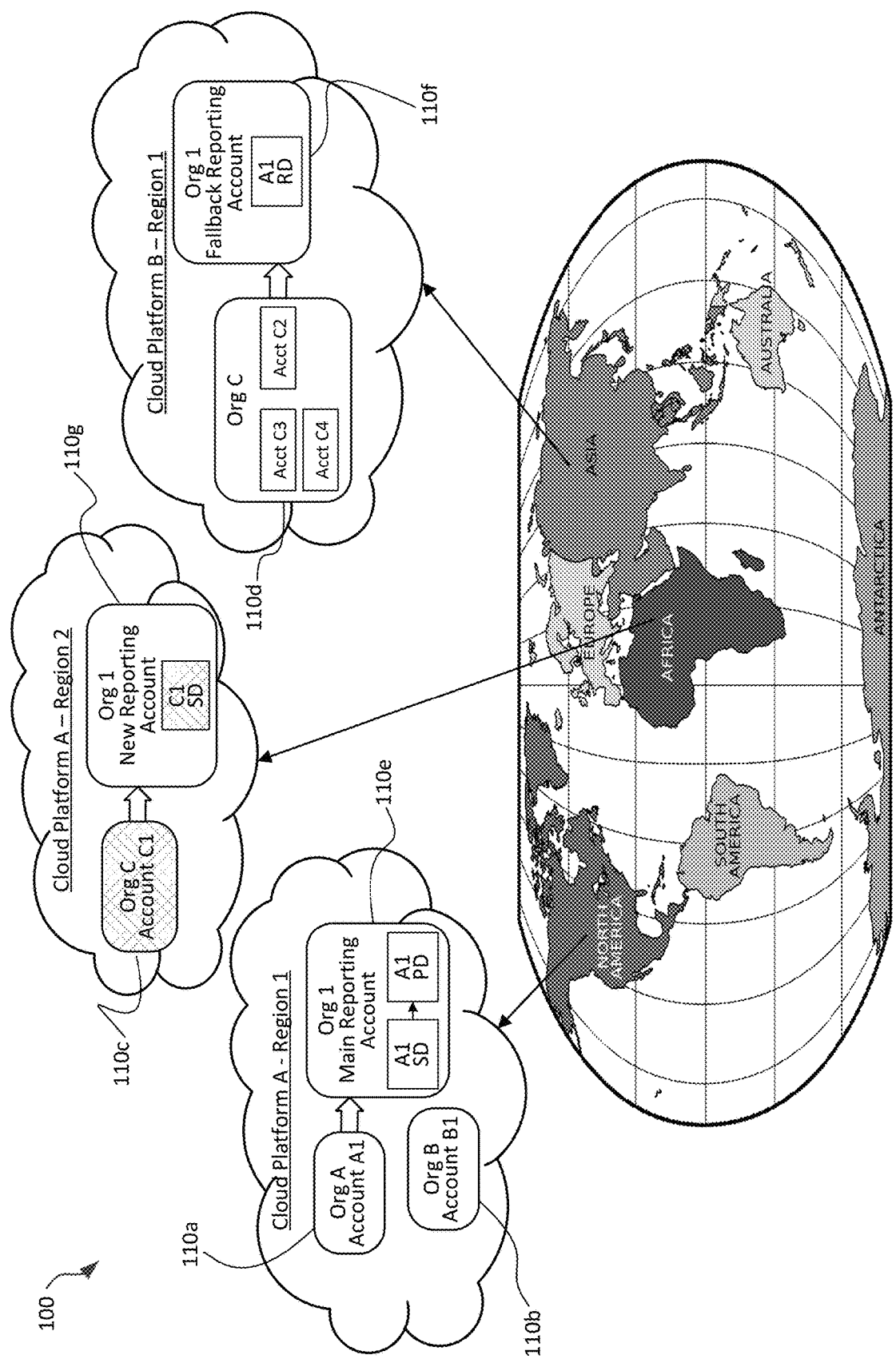
FIG. 4F illustrates an exemplary cloud-based data warehousing system during the data sharing method described in FIG. 3.
Figure 4G:
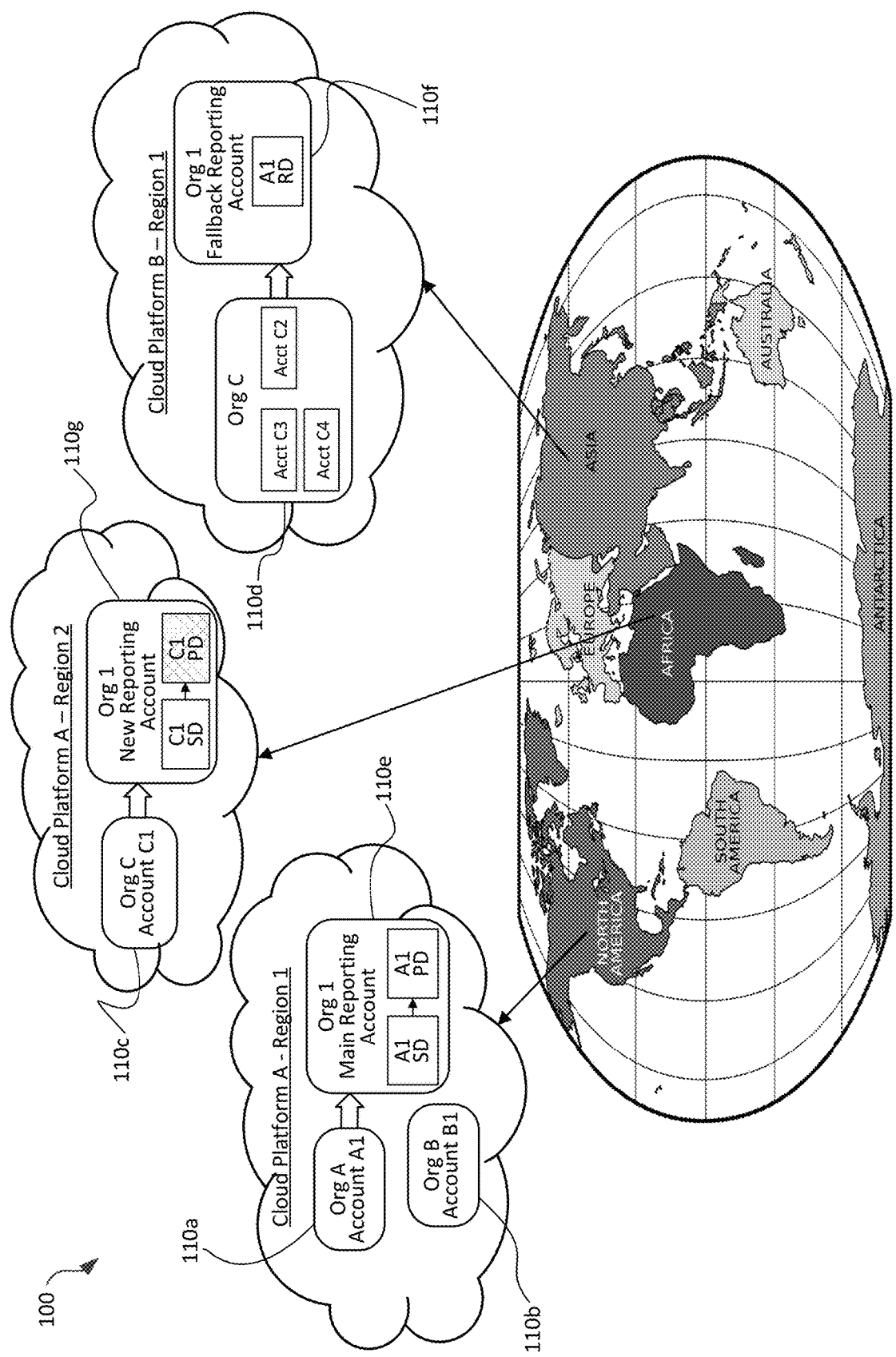
FIG. 4G illustrates an exemplary cloud-based data warehousing system during the data sharing method described in FIG. 3.
Figure 4H:
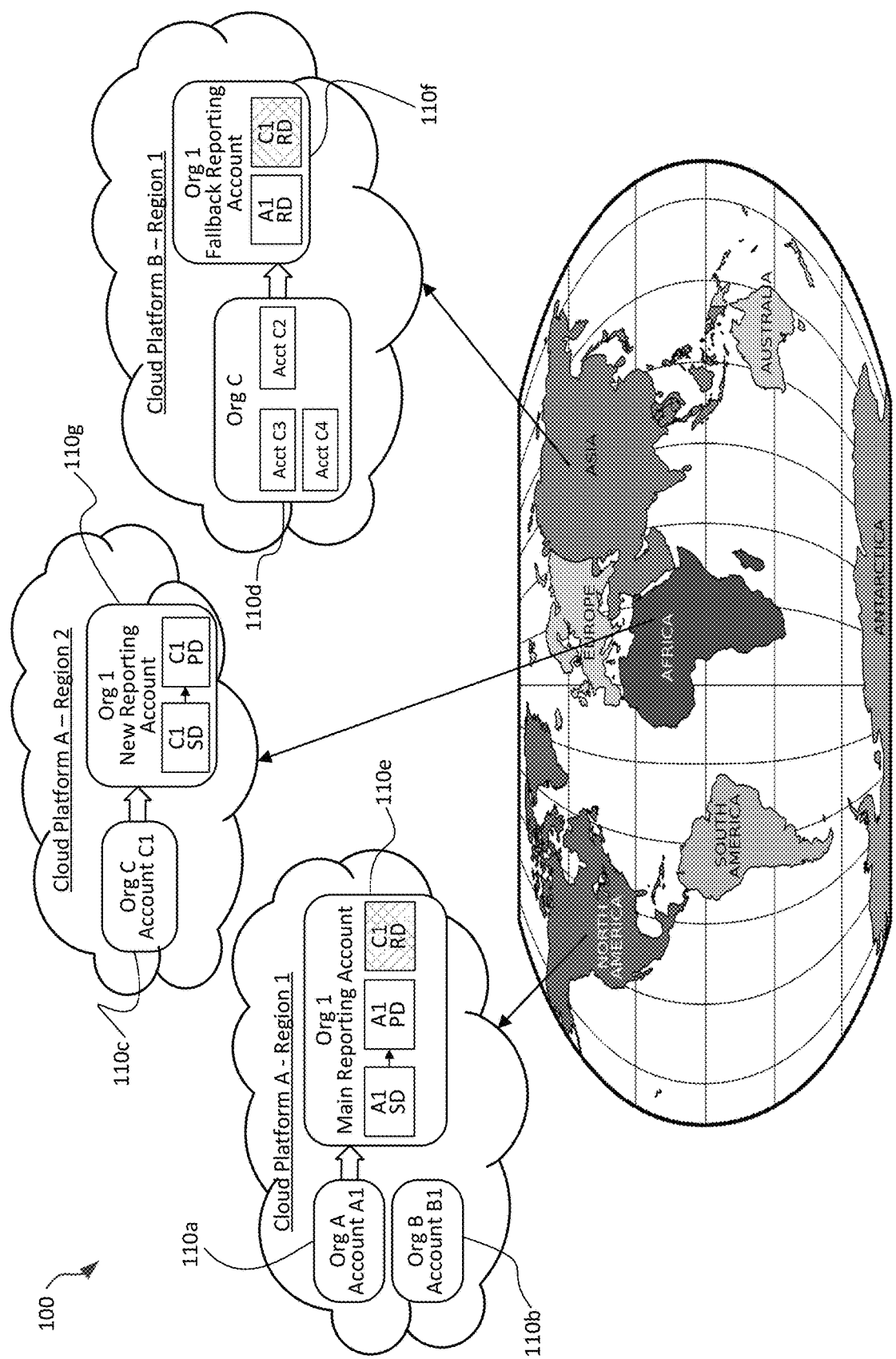
FIG. 4H illustrates an exemplary cloud-based data warehousing system during the data sharing method described in FIG. 3.

As a further example, and referring to FIGS. 4A and 4E-4L if the request at step 302 was to access account data for Organization C, then at step 304, Accounts C1, C2, C3, and C4 may be identified as accounts associated with Organization C, and data warehouses 110c and 110d may be identified as the data warehouses associated with Accounts C1, C2, C3, and C4. It may further be determined that the data warehouse 110c associated with Account C1 is hosted at Region 2 of Cloud Platform A, as shown in FIG. 4A. Accordingly, at steps 306 and 308, it may be determined that Account C1 is hosted on the same cloud platform as the main reporting account, but in a different cloud region, as shown in FIG. 4A. Thereafter, at step 318, it may be determined that there is no secondary reporting account hosted on this different cloud region, as shown in FIG. 4A. Accordingly, at step 320, a new reporting account may be created in Region 2 of Cloud Platform A, and a new data warehouse 110g may be instantiated, as shown in FIG. 4E. At step 324, Account C1 may share its data with the newly-created secondary reporting account and the secondary reporting account's data warehouse 110g may receive a share of the data, as shown in FIG. 4F. At step 326, the first computing device may send instructions to a computing device associated with the data warehouse 110g, to persist the data shared from Account C1, and the data may be persisted, as shown in FIG. 4G. At step 328, Account C1's persisted shared data may be replicated to the first organization's main reporting account associated with data warehouse 110e, and may further be replicated to the fallback reporting account associated with data warehouse 110f, as shown in FIG. 4H. After replicating the data to the main reporting account and/or the fallback reporting account, the method may return to step 308 to process any additional accounts associated with Organization C (such as identified at step 304).

Figure 4I:
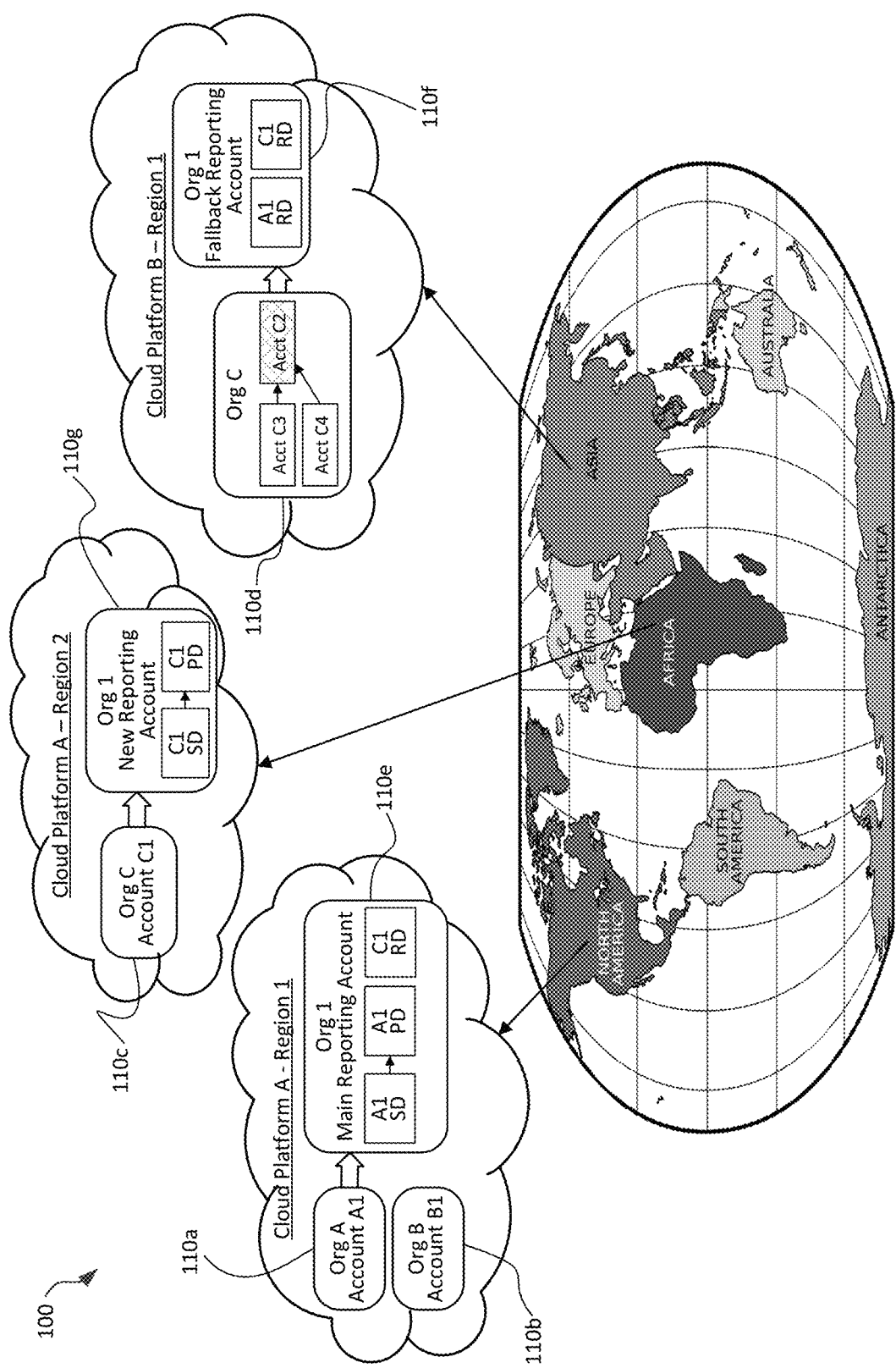
FIG. 4I illustrates an exemplary cloud-based data warehousing system during the data sharing method described in FIG. 3.
Figure 4J:
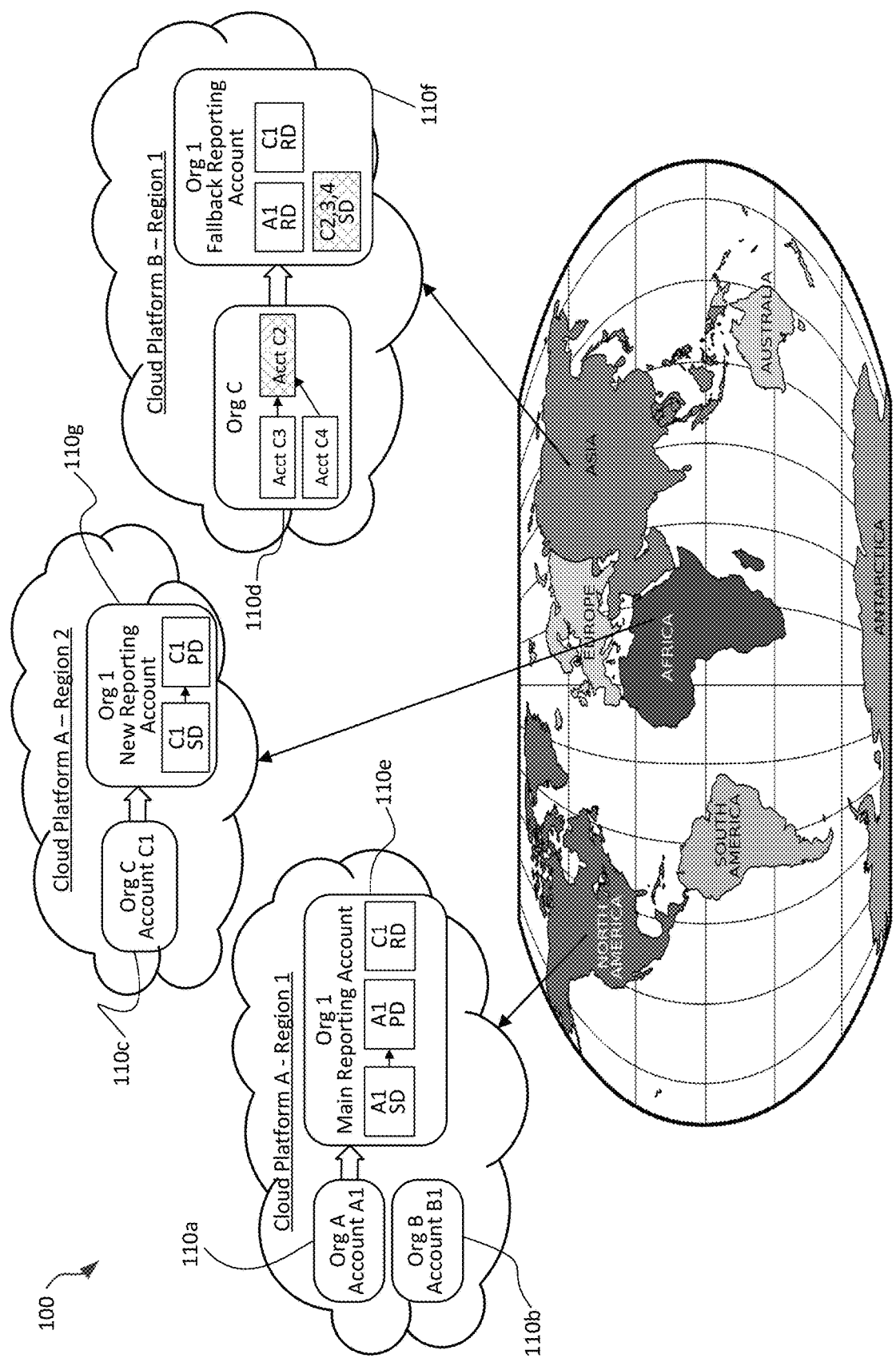
FIG. 4J illustrates an exemplary cloud-based data warehousing system during the data sharing method described in FIG. 3.
Figure 4K:
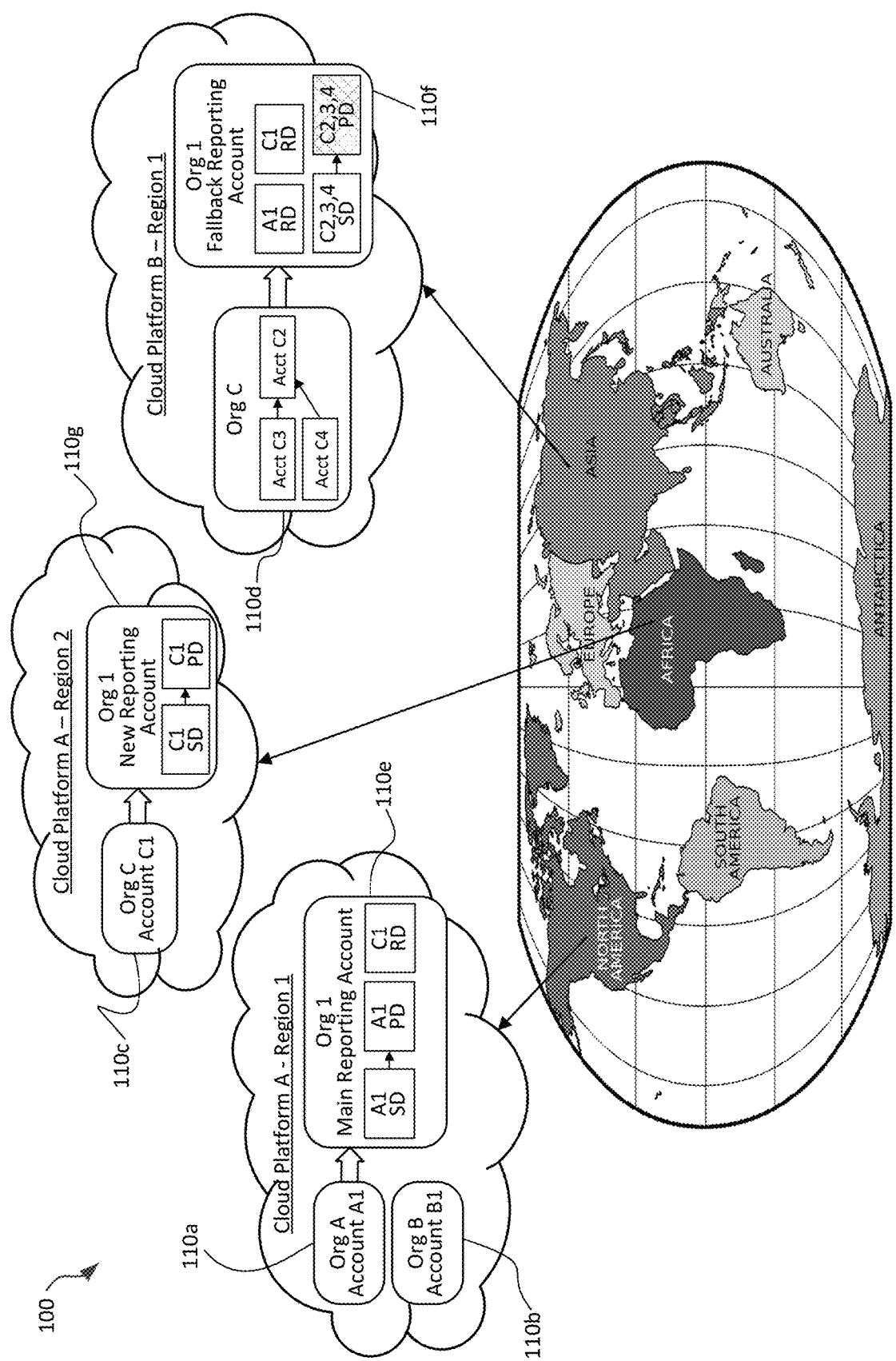
FIG. 4K illustrates an exemplary cloud-based data warehousing system during the data sharing method described in FIG. 3.
Figure 4L:
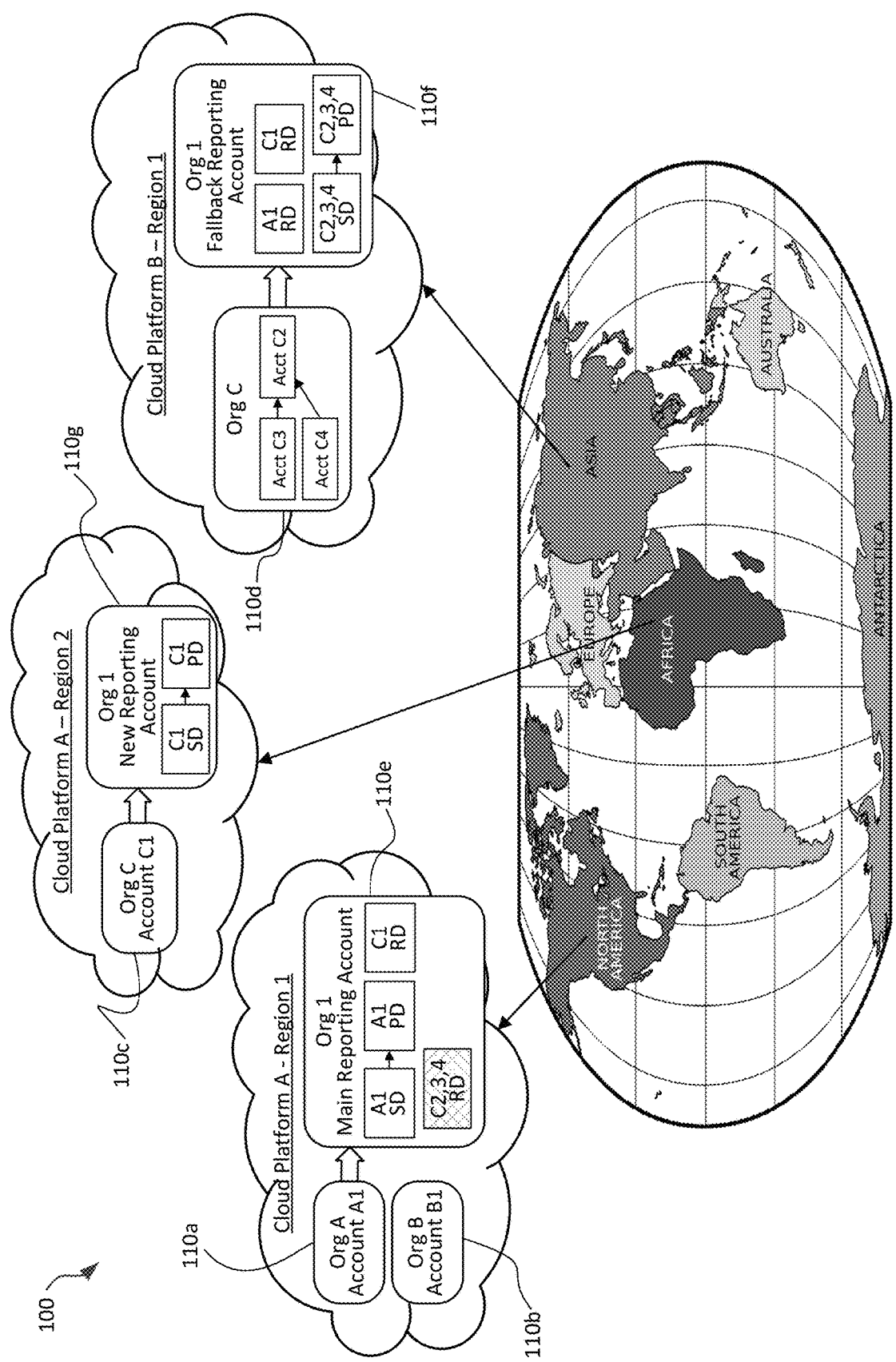
FIG. 4L illustrates an exemplary cloud-based data warehousing system during the data sharing method described in FIG. 3.

Accordingly, Accounts C2, C3, C4, may have additionally been identified as accounts associated with Organization C, at step 304, as described above. At step 304, it may have further been determined that the data warehouse 110d associated with Accounts C2, C3, and C4 is hosted at Region 1 of Cloud Platform B. Accordingly, at step 306, it may be determined that Accounts C2, C3, and C4 are hosted on a different cloud platform from the main reporting account, as shown in FIG. 4H. Thereafter at step 318, it may be determined that there already exists a secondary reporting account on Cloud Platform B, such as the fallback reporting account hosted on data warehouse 110f, as shown in FIG. 4H. Accordingly, at step 322, instructions may be sent to the computing device associated with data warehouse 110d hosting Account C2, C3, and C4, for primary Account C2 to share its data with the fallback reporting account hosted on data warehouse 110f. The instructions may cause secondary Accounts C3 and C4 to first share their data with primary Account C2, before primary Account C2 shares its data, and the shared data from secondary Accounts C3 and C4, with the fallback reporting account, as shown in FIG. 4I. At step 324, primary Account C2 may share its data (and the data shared from secondary Accounts C3 and C4) with the fallback reporting account and the fallback reporting account's data warehouse 110f may receive a share of the data, as shown in FIG. 4J. At step 326, the first computing device may send instructions, to a computing device associated with the data warehouse 110f, to persist the data shared from Accounts C2, C3, and C4, and the data may be persisted, as shown in FIG. 4K. At step 328, Accounts C2, C3, and C4's persisted shared data may be replicated to the first organization's main reporting account associated with data warehouse 110e, and since Account C2, C3, and C4's persisted data already resides in the data warehouse 110f associated with the fallback reporting account, it might not be necessary to replicate the data there, as shown in FIG. 4L. After replicating the data to the main reporting account and/or the fallback reporting account, the method may return to step 308 to process any additional accounts associated with Organization C (such as identified at step 304). If there are no additional accounts, the process may end.

Accordingly, the process described with respect to FIG. 3 and illustrated in FIGS. 4A-4L may enable accounts associated with different organizations, such as a main reporting account associated with a first organization and one or more accounts associated with the first organization's client organizations, to seamlessly and efficiently share data across different cloud platforms and different cloud regions of a cloud-based data warehouse system.

Aspects of this disclosure may additionally enable accounts associated with different organizations, such as the one or more accounts associated with the first organization's client organizations, to seamlessly and efficiently share data across different cloud platforms and different cloud regions of a cloud-based data warehouse system, through the use of one or more intermediary or orchestrating accounts. For instance, one or more orchestrator accounts associated with the first organization may facilitate or orchestrate the sharing of data between Organization A's Account A1 and Organization C's Account C1, when those accounts are hosted in the cloud-data warehouse system 110 on different cloud platforms or regions from one another.

Figure 5:
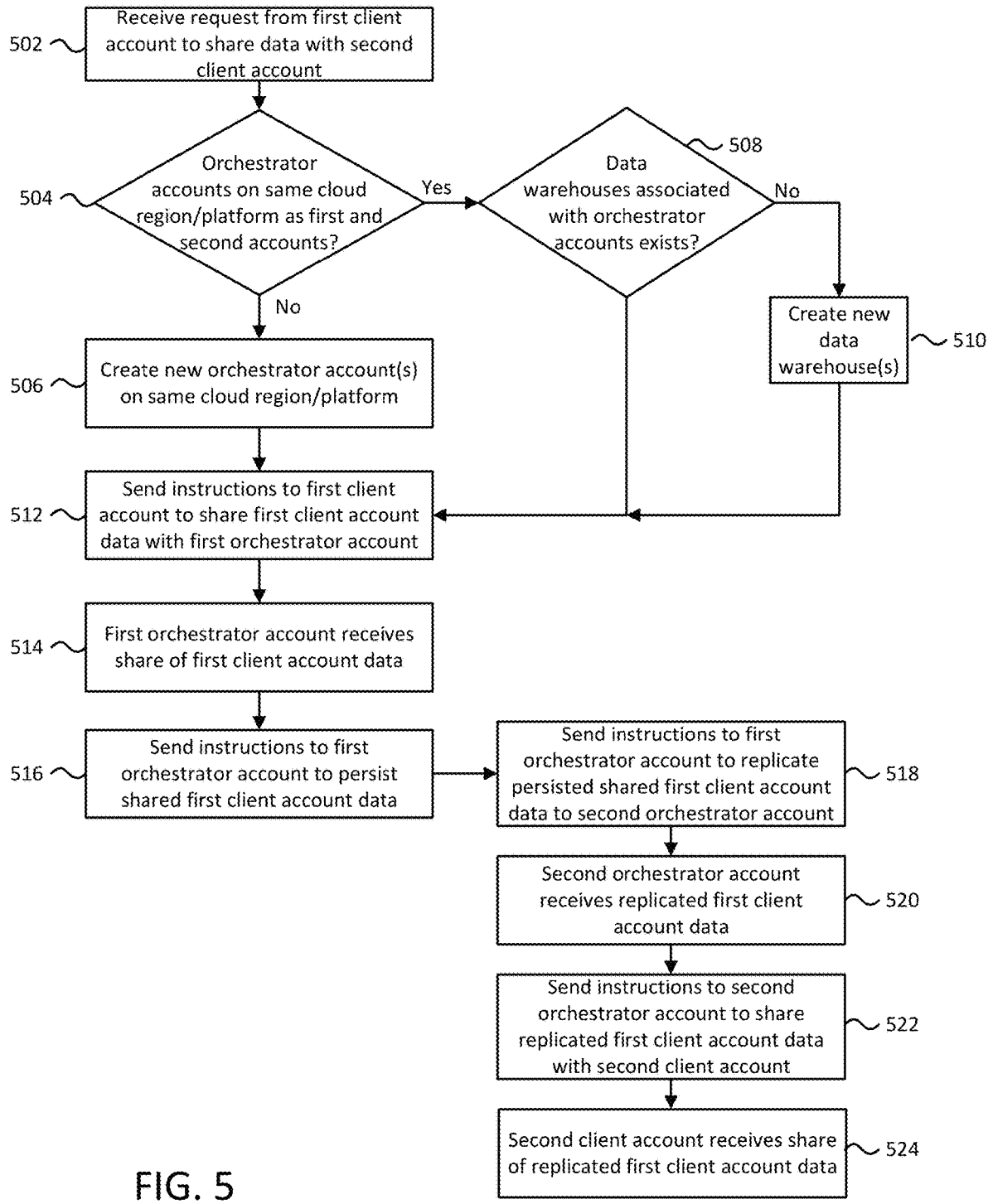
FIG. 5 shows an exemplary flowchart for performing a data sharing method, in accordance with one or more aspects described herein.
Figure 6:
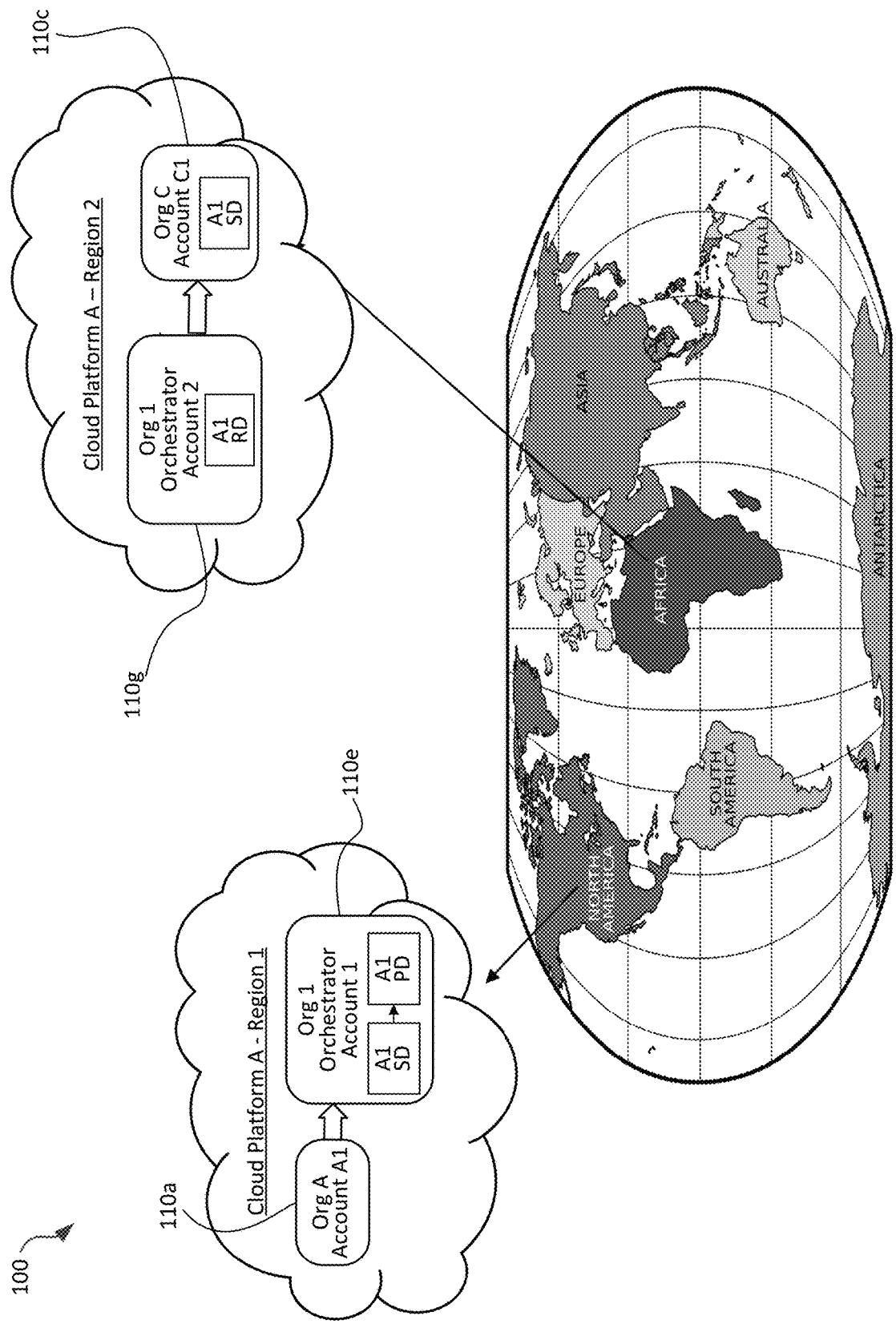
FIG. 6 illustrates an exemplary cloud-based data warehousing system during the data sharing method described in FIG. 5.

For example, referring to FIGS. 5 and 6, at step 502, a request may be received, by an orchestrating device associated with the first organization. The orchestrating device may be the computing device 200 shown in FIG. 2. The request may be received from a first client account, such as Account A1 of Organization A, to share data from its data warehouse 110a with a second client account, Account C1 of Organization C. The first client account may make a request for the facilitation of such sharing when the first client account is hosted in the cloud-based data warehouse system 110 in a different cloud-region or cloud-platform from the second client account, also hosted in the cloud-based data warehouse system 110. For instance, in this example, Account A1 may be hosted in Region 1 of Cloud Platform A, while Account C1 may be hosted in Region 2 of Cloud Platform A. This may be necessary as a result of technical limitations associated with the native features of the cloud-based data warehousing system 110, such as SNOWFLAKE, which may otherwise prohibit the sharing of data, within the cloud-based data warehousing system 110, to an account hosted on a different cloud platform or cloud region, or may prohibit the replication of data to an account when the accounts are associated with different organizations. The request may include information identifying the data to be shared, such as a table, a view, a database, a user defined function, a database, or any other type of data. The request may, additionally or alternatively, include information identifying an amount or size of the data to be shared, such as in number of bytes or number of rows.

At step 504, the orchestrating device may determine whether a first orchestrator account is hosted on the same cloud region and platform as the first client account and whether a second orchestrator account is hosted on the same cloud region and platform as the second client account. The orchestrator accounts may be accounts maintained by the first organization for facilitating the sharing of data, within the cloud-based data warehousing system 110, between accounts of its client organizations. For instance, the orchestrating device may store or access information indicating one or more orchestrator accounts associated with the first organization. The orchestrating device may determine if any of those orchestrator accounts are hosted on the same cloud region and platform as the first client account and second client account. If a first orchestrator account does exist on the same cloud region and platform as the first client account and a second orchestrator account exists on the same cloud region and platform as the second client account, then the process may proceed to step 508. For instance, a first orchestrator account, such as Orchestrator Account 1, may be identified as existing on the same cloud region and platform as the first client account, such as on Region 1 of Cloud Platform A. And a second orchestrator account, such as Orchestrator Account 2, may be identified as existing on the same cloud region or cloud platform as the second client account, such as on Region 2 of Cloud Platform A. Otherwise, if either the first or the second orchestrator accounts do not exist, then the process may proceed to step 506.

At step 506, if it was determined that either the first or the second orchestrator accounts do not exist on the same cloud region and platform as the first client account or the second client account, respectively, then, the orchestrating device may cause a new orchestrator account to be created on that cloud platform or cloud region (e.g., if no orchestrator account exists on the same cloud region and platform as the first client account one will be created there, and if no orchestrator account exists on the same cloud region and platform as the second client account, one will be created there). Creating such accounts may be necessary as a result of technical limitations associated with the native features of the cloud-based data warehousing system 110, such as SNOWFLAKE, which may otherwise prohibit the sharing of data, within the cloud-based data warehousing system 110, to an account hosted on a different cloud platform or cloud region, or may prohibit the replication of data to an account associated with a different organization. Accordingly, to facilitate the sharing and/or replication of data in such cases, a new orchestrator account may be created, on-demand, on the same cloud region and platform as the first client account or the second client account. The orchestrating device may execute a script that may cause the new orchestrator account to be created and configured on the cloud region and platform where the first client account or second client is hosted. Creating and configuring the new orchestrator account may further involve the instantiation and configuration of a new virtual data warehouse 110a-n to be associated with the new orchestrator account. The script may include configuration information indicating computing resources that should be associated with the new data warehouse 110a-n, for example, a quantity of memory, a processor speed, a number of nodes and/or clusters, a size of the warehouse, or the like. The configuration information may further indicate a duration of time for which the new data warehouse 110a-n should be available—such as an hour, a day, a week, indefinitely, etc. Additionally or alternatively, the configuration may be based on information included in the request, such as information indicating an amount of data to be shared. As part of the configuration of the new virtual data warehouse 110a-n, the script may further cause the creation of one or more databases, schema, and/or database objects, in the new data warehouse 110a-n, for receiving the shared data.

If it was determined that orchestrator accounts already exist on the same cloud region and platform as each of the first client account and the second client account (at step 504), then, at step 508, the orchestrating device may further determine whether each of the orchestrator accounts have access to a data warehouse 110a-n for receiving the shared data. For instance, the information accessed at step 504 may further indicate, for each of the orchestrator accounts, corresponding data warehouses 110a-n associated with those orchestrator accounts.

If either of the orchestrator accounts do not have access to a data warehouse 110a-n, the process may proceed to step 510, to create a new virtual warehouse 110a-n to be associated with that orchestrator account. The new virtual warehouse may be created and configured as described above in step 504. In some instances, a data warehouse 110a-n may be associated with the orchestrator account, but may not be properly configured for the particular data request. For instance, the size of the data warehouse may be too small or too large, and may need to be altered, one or more operating parameters associated with computing resources may need to be altered or adjusted, or the like. In this case, the existing data warehouse may be reconfigured based the information provided in the request.

At step 512, after it is determined that the first and second orchestrator accounts and corresponding data warehouses 110a-n exist or were newly created or reconfigured, then the orchestrating device may send, to a computing device associated with the first client account, instructions that may be configured to cause the first client account to share the data with the first orchestrator account. Sharing may involve the first client account granting permission for the first orchestrator account to access the specified data in the data warehouse 110a associated with the first client account. Such sharing may be accomplished without copying or transferring any actual data between accounts. For example, the sharing may be enabled via the architecture of the cloud-based data warehousing system 110, such as through the use of metadata.

At step 514, in response to the instructions to share the first client account's data with the first orchestrator account, the data warehouse 110e, associated with the first orchestrator account, may receive a "share" of the data associated with the first client account. In this case, the first client account (e.g., the sharing or source account) may create a share of one or more of their data warehouse objects (e.g., maintained in the data warehouse 110a-n) comprising the data to be shared, such as schemas, databases, tables, views, stored procedures, functions, etc. and may grant permission to the first orchestrator account to access the data warehouse objects. Receiving the share may involve the automatic creation, in the data warehouse 110e associated with the first orchestrator account, of a read-only database created from the share. Once created, all of the shared data warehouse objects may be accessible from the first orchestrator account.

At step 516, the orchestrating device may send, to a computing device associated with the first orchestrator account, instructions configured to cause the first orchestrator account to persist, such as cache or store, the shared data in the data warehouse 110e associated with the first orchestrator account. The data may be persisted permanently or temporarily. For instance, the persisted data may be stored in a database table of the data warehouse 110e associated with the first orchestrator account. Persisting the data in this manner may be important because native functionality of the cloud-based data warehousing system 110, such as SNOWFLAKE, may prohibit the sharing of data to an account hosted on a different cloud region and/or cloud platform and may further prohibit the replication of a share. The first organization, however, may need to copy or otherwise transmit the shared data to another orchestrator account maintained by the first organization, such as to the second orchestrator account on the same cloud region and platform as the second client account, which is the ultimate target account for receiving the shared data.

At step 518, the orchestrating device may send, to the computing device associated with the first orchestrator account, additional instructions configured to cause the persisted shared data to be replicated to the data warehouse 110g associated with the second orchestrator account hosted on the same cloud region and platform as the second client account, for instance on the Region 2 of the Cloud Platform A. The instructions may further be configured to cause the data warehouse 110e associated with the first orchestrator account to be dropped or suspended after the shared data is replicated to the second orchestrator account, to conserve compute resources. The instructions may cause the data warehouse 110e to be dropped or suspended after a predetermined time, such as after an hour, or a day, etc., of replicating the data to the second orchestrator account.

At step 520, in response to the instructions to replicate the first client account's data to the second orchestrator account, the data warehouse 110g, associated with the second orchestrator account, may receive a replicated copy of the data. Accordingly, because a replicated copy of the data from the first client account—hosted on different cloud region and platform from the second client account—is now on the same cloud region and platform as the second client account, the data may be shared with the second client account.

At step 522, the orchestrating device may send, to the computing device associated with the second orchestrator account, instructions configured to cause the second orchestrator account to, upon receiving the replicated data, share the replicated data with the second client account. The instructions may further be configured to cause the data warehouse associated with the second orchestrator account to be dropped or suspended after the data is shared to the second client account, to conserve compute resources. The instructions may cause the data warehouse associated with the second orchestrator account to be dropped or suspended after a predetermined time, such as after an hour, or a day, etc., of sharing the data to the second client account.

At step 524, in response to the instructions to share the replicated data with the second client account, the data warehouse 110c, associated with the second client account, may receive a "share" of the replicated data associated with the first client account. In this case, the second orchestrator account (e.g., the sharing or source account) may create a share of one or more of their data warehouse objects (e.g., maintained in the data warehouse 110a-n) comprising the data to be shared, such as schemas, databases, tables, views, stored procedures, functions, etc. and may grant permission to the second client account to access the data warehouse objects. Receiving the share may involve the automatic creation, in the data warehouse 110c, associated with the second client account, of a read-only database created from the share. Once created, all of the shared data warehouse objects may be accessible from the second client account.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
receiving, by a first computing device associated with a cloud data management system, and from a first client account hosted by a first cloud-based data warehouse provider on a first cloud region, a request to share data with a second client account hosted by a second cloud-based data warehouse provider on a second cloud region, wherein the first client account is configured for a first organization and the second client account is configured for a second organization;
identifying:
a first data manager account hosted by the first cloud-based data warehouse provider on the first cloud region, and
a second data manager account hosted by the second cloud-based data warehouse provider on the second cloud region;
sending, by the first computing device and to a second computing device associated with the first client account, first instructions configured to cause the second computing device to share the data with the first data manager account;
sending, by the first computing device and to a third computing device associated with the first data manager account, second instructions configured to cause the third computing device to:
create a first data warehouse comprising at least one database for receiving shared data;
upon receiving the data shared from the first client account, persist the data shared from the first client account;
replicate, to the second data manager account, the persisted data shared from the first client account; and
drop the first data warehouse after replicating the persisted data shared from the first client account; and
sending, by the first computing device and to a fourth computing device associated with the second data manager account, third instructions configured to cause the fourth computing device to, upon receiving the replicated persisted data shared from the first client account, share the replicated persisted data shared from the first client account with the second client account.

2. The method of claim 1, wherein sending the second instructions is based on determining that the first data manager account does not have access to at least one database for receiving shared data.

3. The method of claim 1, wherein, based on determining that the second data manager account does not have access to at least one database for receiving shared data, the third instructions further comprise:
fourth instructions configured to cause creation of a second data warehouse for the second data manager account, wherein the second data warehouse comprises at least one database for receiving shared data.

4. The method of claim 1, wherein a sharing protocol associated with one of the first and second cloud-based data warehouse providers prevents sharing of data between accounts hosted on different cloud regions, and
wherein the second cloud region is different from the first cloud region.

5. The method of claim 1, wherein a sharing protocol associated with one of the first and second cloud-based data warehouse providers prevents sharing of data between accounts hosted on different cloud platforms,
wherein the first cloud region is associated with a first cloud platform, and
wherein the second cloud region is associated with a second cloud platform different from the first cloud platform.

6. The method of claim 1, wherein the first cloud-based data warehouse provider is the same as the second cloud-based data warehouse provider.

7. The method of claim 1, further comprising:
determining, based on the request, a size of the first data warehouse, wherein the second instructions indicate the size of the first data warehouse.

8. The method of claim 1, further comprising:
determining, based on the request, a size of a second data warehouse, comprising a database for receiving shared data, associated with the second data manager account, and
wherein the third instructions further comprise fourth instructions configured to cause the fourth computing device to alter, based on the request, a size of second data warehouse, comprising a database for receiving shared data.

9. A first computing device associated with a cloud data management system, wherein the first computing device comprises:
one or more processors; and
memory storing instructions that, when executed by the one or more processors, cause the first computing device to:
receive, from a first client account hosted by a first cloud-based data warehouse provider on a first cloud region, a request to share data with a second client account hosted by a second cloud-based data warehouse provider on a second cloud region, wherein the first client account is configured for a first organization and the second client account is configured for a second organization;
identify:
a first data manager account hosted by the first cloud-based data warehouse provider on the first cloud region, and
a second data manager account hosted by the second cloud-based data warehouse provider on the second cloud region;
send, to a second computing device associated with the first client account, first instructions configured to cause the second computing device to share the data with the first data manager account;
send, to a third computing device associated with the first data manager account, second instructions configured to cause the third computing device to:
create a first data warehouse comprising at least one database for receiving shared data;
upon receipt of the data shared from the first client account, persist the data shared from the first client account;
replicate, to the second data manager account, the persisted data shared from the first client account; and drop the first data warehouse after replication of the persisted data shared from the first client account; and send, to a fourth computing device associated with the second data manager account, third instructions configured to cause the fourth computing device to, upon receipt of the replicated persisted data shared from the first client account, share the replicated persisted data shared from the first client account with the second client account.

10. The first computing device of claim 9, wherein the instructions, when executed by the one or more processors, cause the first computing device to send the second instructions based on a determination that the first data manager account does not have access to at least one database for receiving shared data.

11. The first computing device of claim 9, wherein, based on a determination that the second data manager account does not have access to at least one database for receiving shared data, the third instructions further comprise:

fourth instructions configured to cause creation of a second data warehouse for the second data manager account, wherein the second data warehouse comprises at least one database for receiving shared data.

12. The first computing device of claim 9, wherein a sharing protocol associated with one of the first and second cloud-based data warehouse providers prevents sharing of data between accounts hosted on different cloud regions, and wherein the second cloud region is different from the first cloud region.

13. The first computing device of claim 9, wherein the first cloud-based data warehouse provider is the same as the second cloud-based data warehouse provider.

14. The first computing device of claim 9, wherein the instructions, when executed by the one or more processors, further cause the first computing device to:

determine, based on the request, a size of a second data warehouse, comprising a database for receiving shared data, associated with the second data manager account, and wherein the third instructions further comprise fourth instructions configured to cause the fourth computing device to alter, based on the request, a size of second data warehouse, comprising a database for receiving shared data.

15. A cloud data management system comprising:

a first computing device associated with the cloud data management system;

a second computing device associated with a first client account hosted by a first cloud-based data warehouse provider on a first cloud region;

a third computing device associated with a first data manager account hosted by the first cloud-based data warehouse provider on the first cloud region; and a fourth computing device associated with a second data manager account hosted by a second cloud-based data warehouse provider on a second cloud region, wherein the first computing device is configured to:

receive, from the first client account, a request to share data with a second client account hosted by the second cloud-based data warehouse provider on the second cloud region, wherein the first client account is configured for a first organization and the second client account is configured for a second organization;

identify the first data manager account and the second data manager account;

send, to the second computing device, first instructions configured to cause the second computing device to share the data with the first data manager account;

send, to the third computing device, second instructions configured to cause the third computing device to:

create a first data warehouse comprising at least one database for receiving shared data;

upon receipt of the data shared from the first client account, persist the data shared from the first client account;

replicate, to the second data manager account, the persisted data shared from the first client account; and drop the first data warehouse after replication of the persisted data shared from the first client account; and send, to the fourth computing device, third instructions configured to cause the fourth computing device to, upon receipt of the replicated persisted data shared from the first client account, share the replicated persisted data shared from the first client account with the second client account.

16. The cloud data management system comprising of claim 15, wherein the first computing device is configured to send the second instructions based on a determination that the first data manager account does not have access to at least one database for receiving shared data.

17. The cloud data management system comprising of claim 15, wherein, based on a determination that the second data manager account does not have access to at least one database for receiving shared data, the third instructions further comprise:

fourth instructions configured to cause creation of a second data warehouse for the second data manager account, wherein the second data warehouse comprises at least one database for receiving shared data.

18. The cloud data management system comprising of claim 15, wherein a sharing protocol associated with one of the first and second cloud-based data warehouse providers prevents sharing of data between accounts hosted on different cloud regions, and wherein the second cloud region is different from the first cloud region.

19. The cloud data management system comprising of claim 15, wherein the first cloud-based data warehouse provider is the same as the second cloud-based data warehouse provider.

20. The cloud data management system comprising of claim 15, wherein the first computing device is further configured to:

determine, based on the request, a size of a second data warehouse, comprising a database for receiving shared data, associated with the second data manager account, and wherein the third instructions further comprise fourth instructions configured to cause the fourth computing device to alter, based on the request, a size of second data warehouse, comprising a database for receiving shared data.

21. The method of claim 1, wherein the first data manager account and the second data manager account are maintained by a third organization configured to collect data from a plurality of client organizations comprising the first organization and the second organization.

* * * * *